US012775162B1

(12) United States Patent
Mikkelson

(10) Patent No.: US 12,775,162 B1
(45) Date of Patent: Oct. 27, 2026

(54) AUTOCOLLIMATOR DEVICES, SYSTEMS AND METHODS FOR MEASUREMENT OF ANGLES

(71) Applicant: Dennis Mikkelson, Menomonie, WI (US)

(72) Inventor: Dennis Mikkelson, Menomonie, WI (US)

( * ) Notice: Subject to any disclaimer, the term of this patent is extended or adjusted under 35 U.S.C. 154(b) by 734 days.

(21) Appl. No.: 18/320,744

(22) Filed: May 19, 2023

(51) Int. Cl.
*G01C 3/08* (2006.01)
*G01S 17/50* (2006.01)
*G02B 23/10* (2006.01)
*G02B 27/00* (2006.01)
*G02B 27/30* (2006.01)
*G02B 5/20* (2006.01)

(52) U.S. Cl.
CPC .......... *G02B 27/0018* (2013.01); *G01S 17/50* (2013.01); *G02B 23/10* (2013.01); *G02B 27/30* (2013.01); *G02B 5/205* (2013.01)

(58) Field of Classification Search
CPC .... G02B 27/0018; G02B 27/30; G02B 23/10; G02B 5/205; G01S 17/50
See application file for complete search history.

(56) References Cited

U.S. PATENT DOCUMENTS 3,316,799 A * 5/1967 Daley .................. G01B 11/272 250/225
11,835,704 B1 * 12/2023 Chakmakjian ......... G02B 23/14

FOREIGN PATENT DOCUMENTS

CN 102735431 A * 10/2012 ............ G01M 11/02
CN 204373598 U * 3/2015 ............. G01B 11/00
DE 19525903 A1 * 1/1997 ............. G01B 11/30

OTHER PUBLICATIONS

Vloet, R.E.J.M., Electronic Autocollimation; Traineeship report; Mar. 1995; pp. 1-77; Technische Universiteit Eindhoven, The Netherlands 1995.
T Yandayan, High precision (Advanced) angle metrology, Journal of Physics: Conference Series, article, cover plus 4 pages, IOP Publishing, Kocaeli, Turkey, 2018.
Shinan Qian, et al, Approaching sub-50 nanoradian measurements by reducing the saw-tooth deviation of the autocollimator in the Nano-Optic-Measuring Maching, Letter to the Editor, Nuclear Insturments and Methods in Physics Research A (2015) pp. 206-212, Elsevier B.V.

* cited by examiner

*Primary Examiner* — Mark Hellner
(74) *Attorney, Agent, or Firm* — Anthony J. Bourget

(57) ABSTRACT

Devices, systems, and methods for measurement of angles including an autocollimator based on discovery that secondary reflections from surfaces at or near a focal plane of an objective lens of the autocollimator present unwanted measurement errors, the autocollimator configured in one aspect to have a reticle and a light sensor where the reticle and/or the light sensor is tilted with respect to an optical axis to reduce or avoid a reflection of the reticle and/or the light sensor from traveling to the light sensor in order to reduce or eliminate measurement errors.

23 Claims, 27 Drawing Sheets

One-Stop Neutral Density Filter (0.5 Transmission)

Two One-Stop Neutral Density Filters (0.25 Transmission)

AUTOCOLLIMATOR DEVICES, SYSTEMS AND METHODS FOR MEASUREMENT OF ANGLES

BACKGROUND OF THE INVENTION

An autocollimator is an optical instrument for non-contact measurement of angles. Autocollimators are typically used to align components and measure deflections in optical or mechanical systems. They are also often used for flatness measurement by measuring straightness of multiple lines along the surface being measured. Very accurate high resolution autocollimators are used for optical testing and scientific research. An autocollimator projects an image onto a target mirror (or reflective test object) and measures the deflection of the returned image against a scale or reticle. The returned image is viewed visually or via an electronic detector or image sensor.

Typically, and with reference to FIG. 1, an autocollimator 100 combines two functions, an image projector 122 and a telescope 124. A projected image 126 is reflected back to the autocollimator 100 by a mirrored test surface 128. The tilt angle of the test surface 128 is to be measured. The reticle projection optical path 136 starts with light from a light source 132 passing through a reticle 130, reflecting off a beamsplitter 140 (via a diagonal therein) and passing through an objective lens 150. The total distance from the reticle 130 to the objective lens is set to be the focal length of the objective lens, so the light passing through a single point on the reticle will be projected out from the objective along parallel lines. That is, the projector 122 projects the image of the reticle 130 to "infinity." A return optical path 138 through the telescope 124 is from the test mirror 128 back through the objective lens 150, straight through the beamsplitter 140 to an electronic detector or eyepiece 160. The telescope portion 124 focuses the reflected image of the reticle 130 on to the sensor 160. The distance from the objective lens to the image sensor is set to be the focal length of the objective lens, so the telescope portion is also focused at infinity. The position of the reflected image on the sensor 160 is used to determine how much the test mirror 128 is tilted away from being perpendicular to the optical axis 134 (see FIG. 2) of the autocollimator. The optical axis 134, as shown in FIG. 2, is a line or path along which light propagates through the system, and typically passes through a center of curvature of each surface. FIG. 2 also illustrates the role of the beam splitter 140 in making the optical axes 134 of the projector 122 and telescope 124 function co-linear. If the mirrored test surface 128 is exactly perpendicular to the optical axis 134, the reflection will be back in exactly the same direction, and the reticle image 126 will be centered on the image sensor 160. If the mirrored test surface 128 is slightly tilted, the reticle image 126 will be correspondingly offset from the center of the sensor 160 (or the image will move as compared to a prior reference position). A beam splitter 140 is used to superimpose the optical axis 134 of the projector portion 122 and the telescope portion 124 of the autocollimator 100 as shown in FIG. 2. Consequently, the placement of the reticle 130 and light 132, on the one hand, and the sensor 160, on the other hand, can be interchanged and are often interchanged on different autocollimators. The beam splitter 140, is usually a prism beam splitter as shown, but it could also be a plate beam splitter.

The sensitivity of commercial autocollimators ranges from a few arcseconds to a few thousandths of an arcsecond. To obtain such high sensitivity and accuracy, precision autocollimators typically use an electronic sensor to determine the position of the returned image. The sensor may be a position sensitive detector, a quadrant photodiode, or a pixelated ccd or cmos detector with pixels arranged in a one-dimensional array (linear ccd or cmos detector) or in a two dimensional array (ccd or cmos image sensor). A linear detector (one-dimensional array 160*a*), depicted in FIG. 3A, has the advantage of a higher readout rate although the tilt angle of the test surface can only be measured in one direction. Generally, the sensitivity of autocollimators increase with increasing focal length of the objective and corresponding increased size. High-end autocollimators can cost a hundred thousand dollars or more. Some of the best commercially available autocollimators use linear detectors. Specifically, the Moller-Wedel Elcomat instruments use such detectors. If the tilt angle is to be measured in both the horizontal and vertical directions, then either a two-dimensional image sensor and corresponding reticle are used, or two one-dimensional autocollimators 100 can be combined in one system 100'. In this case the autocollimators 100, 100 are combined using a third beam splitter 140' between a shared objective lens and the beam splitters 140, 140 for the horizontal and vertical measurement sources and sensors 160*a*, 160*a* as depicted in FIG. 4. To improve the accuracy of measurements made using a linear sensor 160*a*, a corresponding reticle 130, FIG. 3B having multiple lines, where the effective position of the returned image is calculated based on an average of the positions of the images of individual lines. The number of lines ranges from two to eight in some commercially available instruments to thirty-eight or more lines in some research instruments. FIG. 3A, 3B are conceptual drawings of a one-dimensional linear sensor 160*a* and corresponding reticle 130 for measuring test surface tilt angles in the horizontal direction, that is, rotation of the test surface about a vertical axis.

State of the art autocollimators are very sensitive and accurate, however they still have measurement errors that are significant for many applications. For typical instruments with pixelated detectors, measurements on the order of a few thousandths of an arc-second require determining the position of the returned image to 1/100th of a pixel or less. Further, the structure of the error function is fairly complicated and has been difficult to model or correct using a calibration curve. FIG. 5 shows measured error functions of an excellent high accuracy autocollimator with linear sensors and reticles with eight lines, as published in T Yandayan 2018 J. Phys.: Conf. Ser. 1065 142002. The autocollimator used to produce the data in FIG. 5 is of the nature shown in FIG. 4 for measuring both vertical and horizontal movement of a test object. The graphs show the autocollimator errors for various tilt angles of the surface under test for two test conditions. The error curves 501 and 502 were measured with the autocollimator 300 mm and 600 mm from the test surface respectively. The data were taken with an Elcomat 3000 at the National Metrology Institute of Turkey. While these autocollimators are very sensitive and accurate, there is room for improvement.

SUMMARY OF THE INVENTION

Because autocollimators are able to detect very tiny angular movements, even small or seemingly insignificant interference or variations can have a significant impact on the accuracy of measurements. A key aspect of the present invention is the discovery that one source of errors in the measurements is the presence of unwanted low-level secondary reflections from optical surfaces near the focal plane of the objective lens impinging on the image sensor. Applicant has found that sources of these unwanted reflections, albeit seemingly insignificant, include secondary reflection of the returned image off the surface of the reticle itself and/or off the surface of the sensor itself and/or off the surface of the glass which covers the sensor. These secondary reflections reflect back to the sensor and the position of these reflections on the sensor is independent of change in the angle of the test mirror. These unwanted secondary reflections are indeed significant (or may be significant), and result in erroneous light readings and corresponding errors in the measurement of angular movement of the test mirror. Accordingly, in one aspect of the invention, the problem of correcting imprecise measurements of autocollimators is solved by eliminating or reducing the residual image caused by secondary reflection or diffusion of light from the reticle or from the sensor (or from surfaces at or near the focal plane of the objective lens) so that no such secondary reflections or diffusions off the reticle image (or off the sensor itself) reach the image sensor. In aspects, the secondary reflection may be the secondary reflection of the reticle image off the reticle, or the secondary reflection of the reticle image off the sensor/cover glass, or the secondary reflection of the reticle image off surfaces at or near the focal plane of the objective lens. In aspects, the invention includes eliminating these unwanted secondary reflections, and in other aspects the invention includes reducing the unwanted secondary reflections or reducing the impact of the unwanted secondary reflections.

In further aspects the problem is solved by reducing the residual image so that if a reduced secondary reflection or diffusion off the reticle image (or off the sensor itself, or off surfaces at the focal plane) does reach the sensor, such secondary reflection is sufficiently limited that it does not disrupt precise measurement by the autocollimator.

A beam splitter in a typical autocollimator makes the optical axes of the projector and telescope colinear and optically places the light source (reticle) and the image sensor in the same location in the image plane of the objective. Illumination of both the reticle and the image sensor of an autocollimator reveals an image of the reticle superimposed on the image sensor (when viewed through the objective lens). Applicant has found that as a result of the coincident optical paths of the image projector and measuring telescope along the optical axis 134, the light returning from the test mirror, in addition to traveling to the sensor as desired, is also returned to the reticle. This is because the light returned from the test mirror travels back through the beamsplitter where it is split again to both the reticle and the sensor. Applicant has discovered that some of this light returning from the test mirror will be reflected or scattered by the reticle itself (and also reflected or scattered by the sensor) and bounce back in the reverse direction along the optical path(s), again through the beamsplitter and through the lens towards the test mirror, where it is again reflected back into the measuring telescope (i.e., yet again back through the lens and the beamsplitter) to the light sensor. In one aspect, this secondary returned light forms a faint image of the reticle on the image sensor (and again on the reticle) and produces a very low-level residual "ghost image" of the reticle upon the image sensor. This ghost image of the reticle on the sensor (or, depending on the reflectivity of the surfaces of the reticle and/or of the sensor, these multiple ghost images) introduces a structured non-uniform background signal on the sensor at a fixed position that doesn't change as the angle of the test mirror is varied. If the instrument is perfectly aligned, this ghost image of the reticle will be centered on the sensor.

FIG. 7 represents a faint secondary reflection 35*b*' of a simple crosshair reticle 30 that remains fixed as the test surface is tilted, while the desired returned image 26' moves as the test surface mirror is tilted. FIG. 8 similarly depicts a faint secondary reflection 35*b*' of a four line reticle 30 in a fixed position at the center of a linear sensor 60*a*, while the desired returned image 26' moves as the test surface mirror is tilted. FIG. 6 shows an error function, as measured by the Applicant, of an autocollimator 100 with linear sensors 60*a* and reticle 30 with four lines, after applying a quadratic calibration function. The curve shows the residual error relative to the calibration curve of an Elcomat 3000 autocollimator, with scan position measured in arc-seconds along the X-axis and offset measured in arc-seconds along the Y-axis.

Heretofore it was unappreciated that such secondary reflections existed, and/or unappreciated that the secondary reflections caused the error measurements shown in FIG. 5 and FIG. 6, and/or unappreciated that the secondary reflections had an impact on accuracy of measurements of autocollimators. The data of FIG. 5 was presented for investigation of distance-dependent effects of autocollimators, i.e., at an optical path of 300 mm vs. 600 mm, and without appreciation of the secondary reflections discovered by Applicant. In addition to appreciating such secondary reflections and their impacts on measurement accuracy, Applicant has solved the problems by eliminating and/or reducing or otherwise accounting for the secondary reflections.

As the tilt angle of the test surface changes, the desired returned image is moved or sweeps across the sensor. When the desired returned image passes the fixed ghost image at the sensor, the intensity values are augmented by the intensity values of the residual image by differing amounts depending on the exact position of the returned image relative to the ghost image. This augmentation varies and leads to measurement errors when the returned image is near the fixed residual image. If the fixed residual image is located at or near the center of the sensor, the measurement errors occur at or near the center of the sensor. Applicant has discovered that low-level periodic background variation on the sensor due to the faint ghost image of a reticle with four or eight lines is what leads to the oscillatory component of the error shown in FIG. 6 and FIG. 5 respectively. The resulting errors cause problems when very accurate measurements are required. As shown in FIG. 6, while small, such errors from secondary reflections can be the dominant source of errors near the "ghost image" of the reticle even after instrument calibration. The discovery of, and elimination or reduction of these unwanted reflections, are aspects of Applicant's invention as addressed herein.

In accordance with aspects of the invention, then, an autocollimator is provided where this residual image is eliminated, reduced, redirected or otherwise addressed.

In accordance with aspects of the invention, then, an autocollimator is provided where measurement error otherwise caused by secondary reflection of the reference light from surfaces at or near the focal plane is substantially reduced.

In aspects, a problem of imprecise measurements of autocollimators is solved by eliminating or reducing the residual image caused by secondary reflection or diffusion of light from the reticle or sensor so that such secondary reflections or diffusions of the reticle image are eliminated or reduced or fail to reach the image sensor.

In one aspect, the invention includes an autocollimator for projecting a reference light onto a reflective test object to determine movement of the test object, the autocollimator including a light source projector which projects the reference light through a beamsplitter and through an objective lens and to the test object, and a measuring telescope comprising a light or image sensor which receives, through the objective lens and through the beamsplitter, the reference light reflected from the test object to determine movement of the test object, the light source projector and/or the measuring telescope configured to reduce or eliminate secondary reflections of the reference light back to the sensor.

In further aspects, the present autocollimator is provided where either one or both of the reticle and the image sensor are configured whereby light reflected off them is reflected so as to not return to the image sensor. In this way there is no residual or "ghost" image of the reticle transmitted to the image sensor which would otherwise distort the sensor measurements. In aspects the reticle is oriented or tilted with respect to the optical axis or propagation direction of the light beam toward the image sensor. In aspects the image sensor is oriented or tilted with respect to the optical axis or propagation direction of the light beam toward the image sensor. Tilting the reticle and/or image sensor directs the unwanted low-level reflected light away from the image sensor. In other aspects the reticle includes a curved surface such that light reflected from the reticle does not travel to the image sensor (or only a very minor aspect is reflected toward the image sensor). In further aspects, a polarizer or set of polarizers are used to eliminate or redirect the reflected reticle image so that the reflected reticle image does not travel to the image sensor. In further aspects, a surface of the reticle comprises nanoparticles or a nanotextured surface which dampens or eliminates reflected light so that no light (or reduced amount of light) is reflected from the reticle to the image sensor. In further aspects, a neutral density filter is positioned to reduce or eliminate measurement error caused or otherwise caused by secondary reflection of the reference light from surfaces at or near the focal plane.

In a further aspect the present invention includes an autocollimator for projecting a reference light onto a reflective test object to determine movement of the test object, the autocollimator including a light source projector which projects the reference light through a beamsplitter and through an objective lens and to the test object, a measuring telescope comprising a light sensor which receives, through the objective lens and thorough the beamsplitter, the reference light reflected from the test object to determine movement of the test object, and a neutral density filter, the lens positioned between the neutral density filter and the beam splitter. In other aspects the neutral density filter may be positioned between the lens and beam splitter, between the reticle and the beam splitter and/or between the sensor and the beam splitter.

In a further aspect the invention includes an autocollimator for projecting a reference light onto a reflective test object to determine movement of the test object, the autocollimator having a light source projector which projects the reference light through a beamsplitter and through an objective lens and to the test object, the objective lens defining a focal plane, a measuring telescope comprising a light sensor which receives, through the objective lens and through the beamsplitter, the reference light reflected from the test object to determine movement of the test object, and means for substantially reducing measurement error caused by secondary reflection of the reference light from at or near the focal plane. In aspects, the means for substantially reducing includes one from the group of a neutral density filter, a circular polarizer, a baffle (whether the baffle is positioned in front of the lens or in front of the sensor and/or in front of the reticle), a reduced aperture positioned in front of the lens, a curved surface positioned between the reticle and beam splitter, a curved surface positioned between the sensor and beam splitter, a planar surface at or near the focal plane oriented such that secondary reflections from the planar surface are directed other than along an optical axis of the light source. In aspects, such means for substantially reducing includes means for preventing secondary reflection of the reference light from at or near the focal plane from reaching the sensor and also include means for preventing measurement error caused by the secondary reflection.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
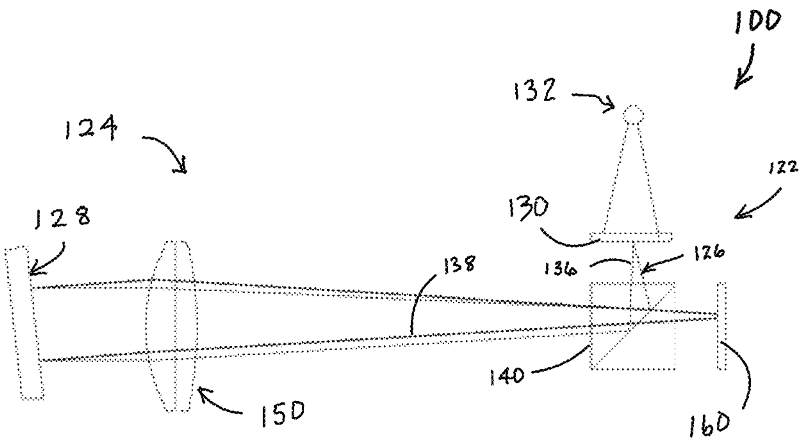
Fig. 1 (Prior Art)
FIG. 1 is a schematic view of a representative prior art autocollimator together with a test object or test mirror.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

As referenced in-part above, aspects of Applicant's invention include the discovery of the existence of secondary reflections and appreciation of the problems created by such reflections in the context of autocollimators. Applicant's invention also includes devices, systems and methods for eliminating or reducing or otherwise addressing these secondary reflections so that more accurate measurements are available for autocollimators.

Figure 2:
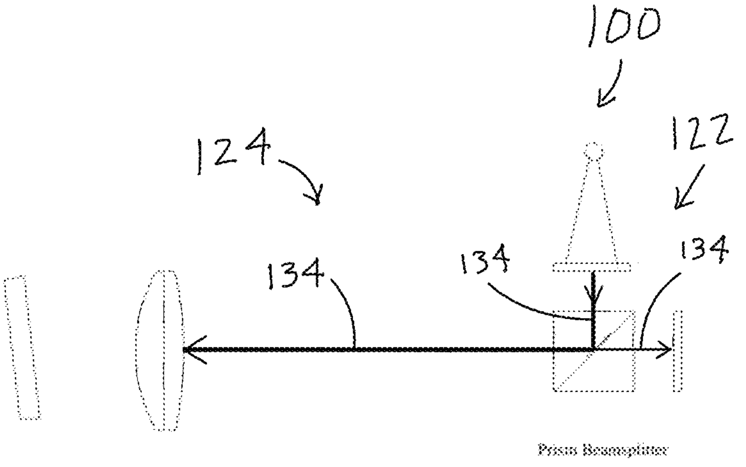
Fig. 2 (Prior Art)
FIG. 2 is a further schematic view of the autocollimator of FIG. 1.
Figure 7:
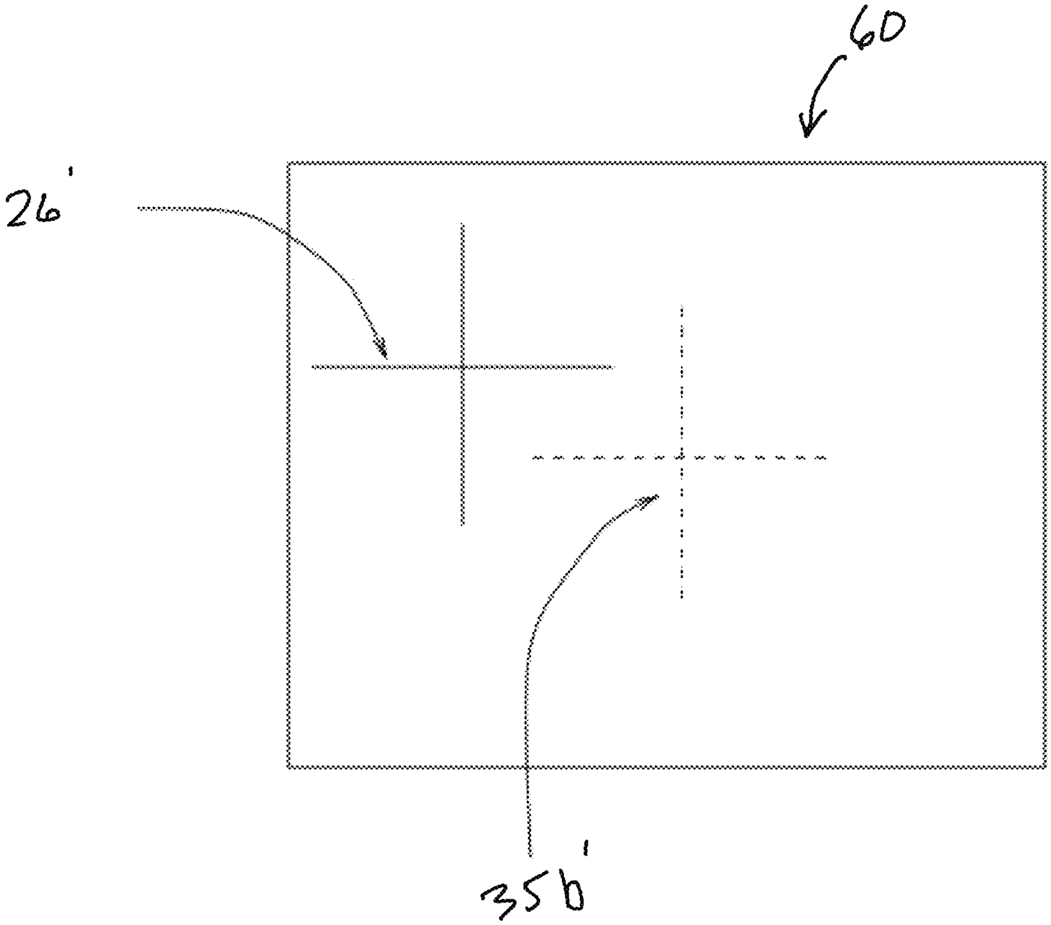
FIG. 7 depicts a representative area sensor with secondary reflection image.
Figure 8:
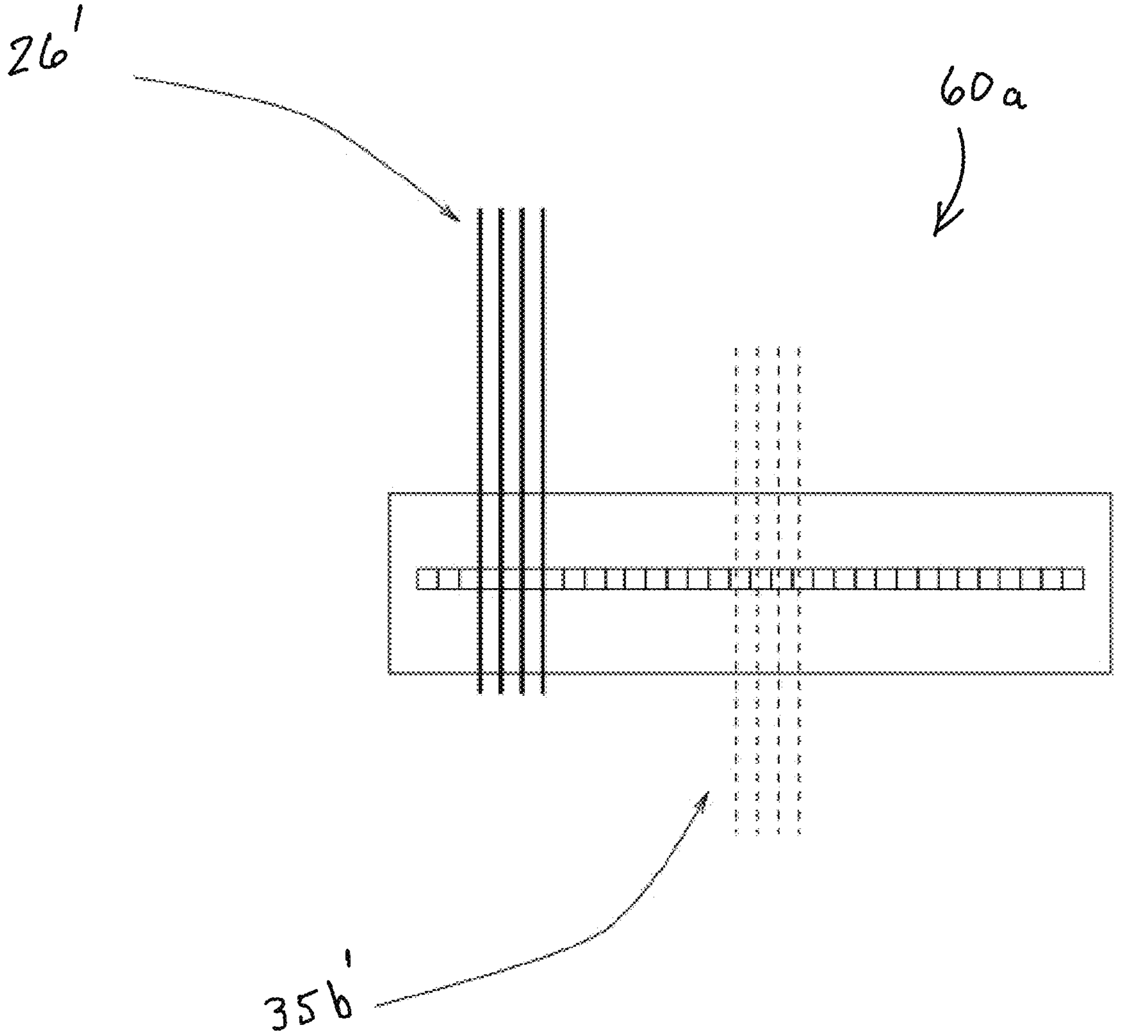
FIG. 8 depicts a linear sensor with secondary reflection image.
Figure 9A:
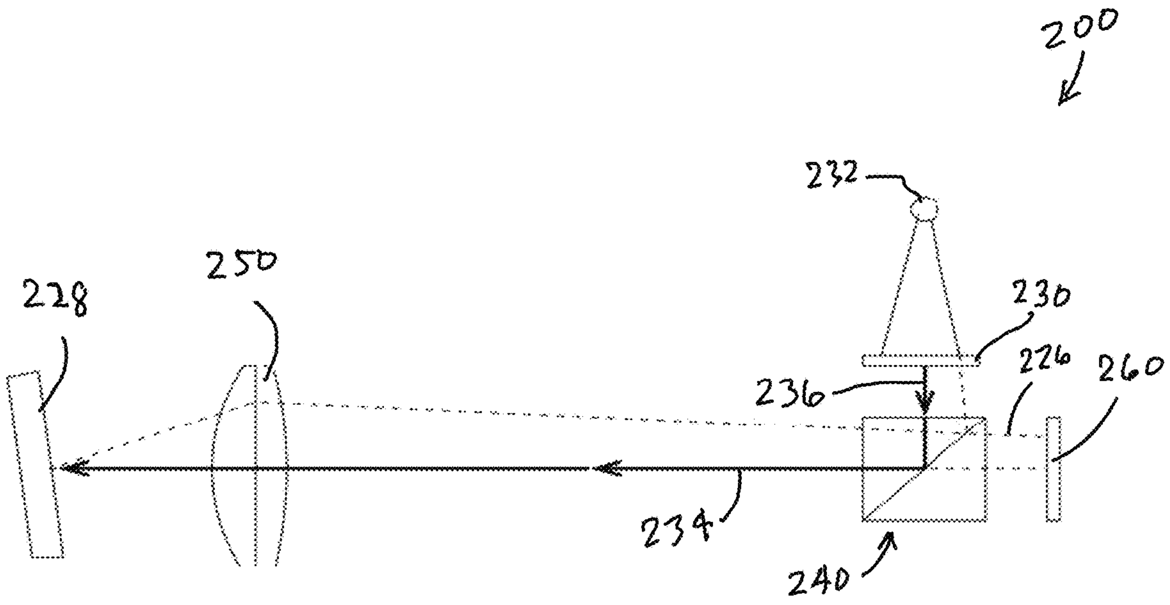
FIG. 9A-FIG. 9D are schematic views of representative optical paths regarding prior art autocollimators.
Figure 9B:
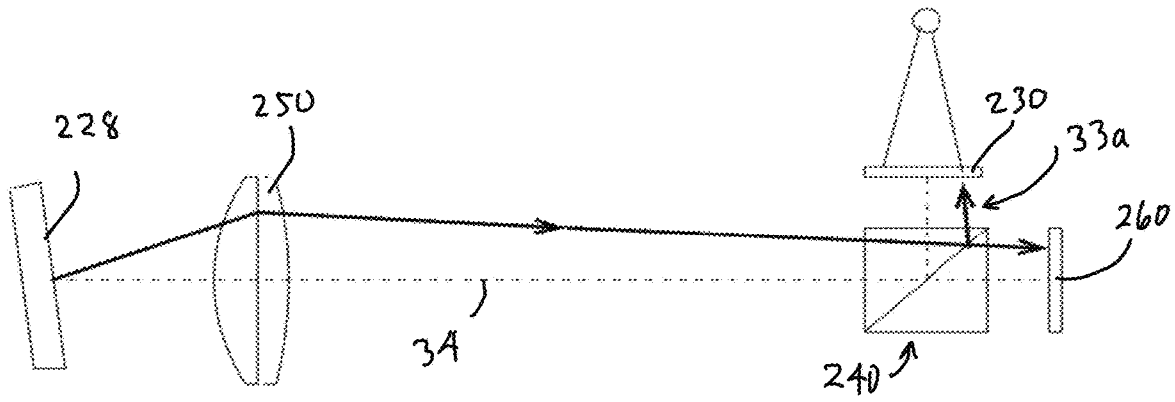
Figure 9C:
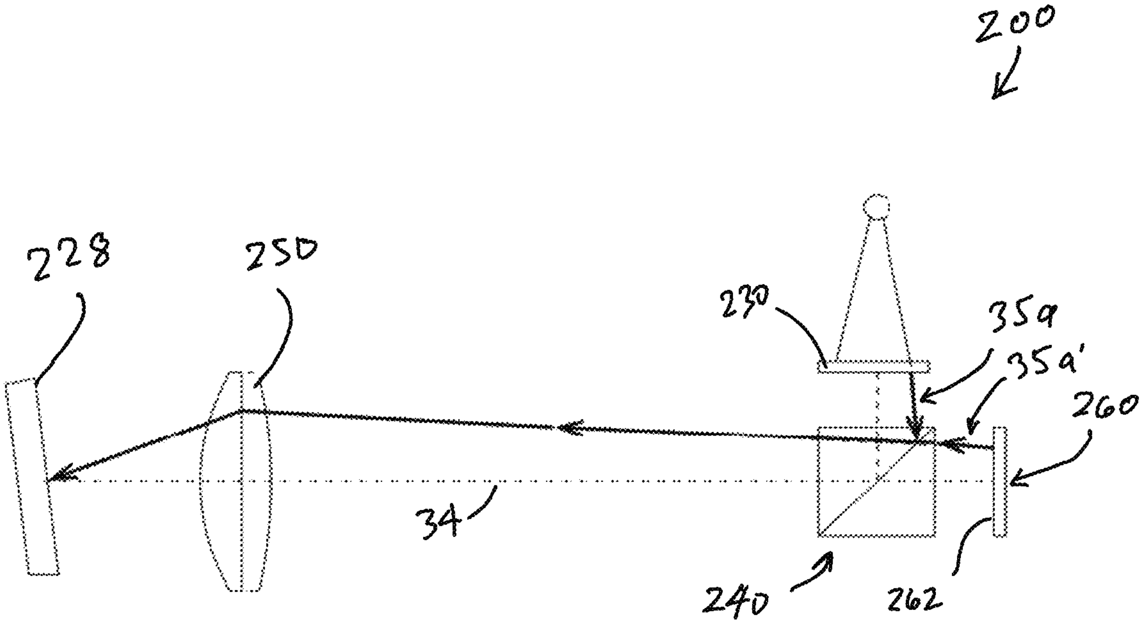
Figure 9D:
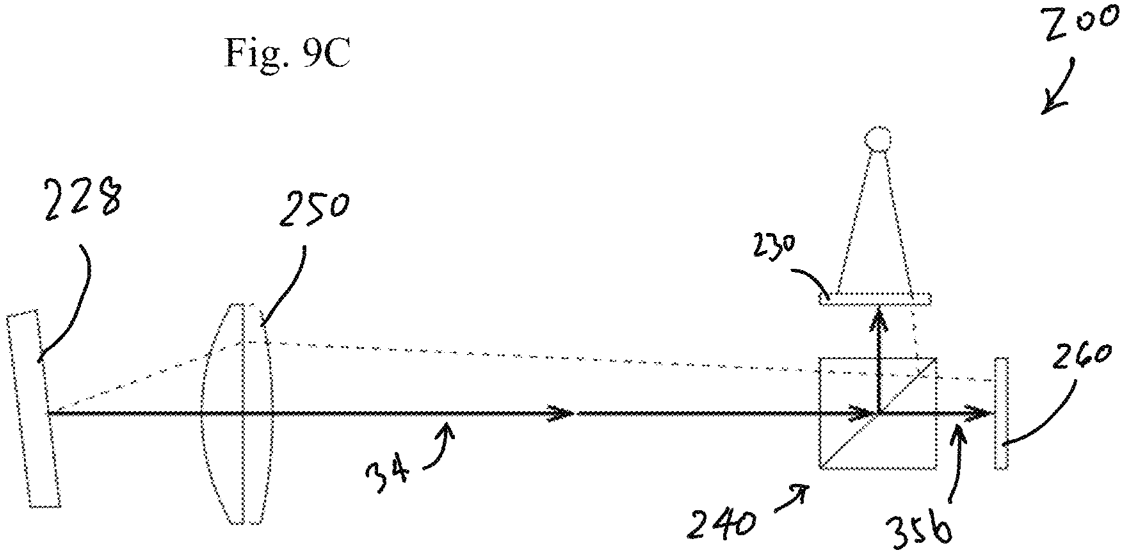

While traditional autocollimators 100 may be known as presented above with respect to FIG. 1 and FIG. 2, what has been discovered and appreciated by Applicant is the existence of particular secondary reflections in the context of autocollimators and the impact of those secondary reflections which are now described. Applicant's discovery of the secondary reflections in this context is addressed in-part with reference to FIGS. 9B-9D, and FIGS. 10A-10D where representations of the traveling light rays are shown. Also depicted is FIG. 9A which shows an autocollimator 200 where the travel of light is understood as in FIG. 1 and FIG. 2, i.e., where a projected image 226 is projected via a light source 232 projecting the light through a reticle 230. The projected light travels generally along optical path 236 and along optical axis 234. Yet as presented in FIG. 9B, Applicant discovered that a portion of the light (i.e., light portion 33*a*; See FIG. 9B) is reflected from test object 228, travels back through the beam splitter 240 and back to the reticle 230. This returned light portion 33*a* then reflects or scatters from the reticle 230 (as a secondary reflection 35*a*; See FIG. 9C) back through the beam splitter 240 and to the test object 228 a second time. This light reflects from the test object 228 a second time and a portion of this second-reflected light (i.e., secondary reflection 35*b*) travels to the image sensor 260 (See FIG. 9D). This second-reflected light (secondary reflection 35*a*, 35*b*) results in an unwanted faint image ("ghost image") of the reticle 230 superimposed on the image sensor 260 at a fixed position, creating a non-uniform background signal on the sensor 260. FIG. 7 depicts the desired returned image 26' of a simple crosshair reticle together with a faint secondary reflection 35*b*' of the reticle at a fixed position on the area sensor 60. FIG. 8 depicts a linear sensor 60*a* with the desired returned mage 26' of a multi-line reticle together with a faint secondary reflection 35*b*' of the reticle at a fixed position on the sensor. If the autocollimator 200 is perfectly aligned (i.e., with reticle 230 and sensor 260 in the focal plane of the objective and centered on the optical axis 134), then a problem region having the secondary reflection superimposed on the sensor 260 will be at the center of the sensor 260. Otherwise, the problem region having the secondary reflection will be at a region of the sensor which corresponds to the reticle center when viewed through the objective lens.

Applicant has also discovered a similar low-level secondary reflection 35*a*' (See FIG. 9C) back from a surface of the sensor 260 and/or from a surface of a cover glass 262 which covers the sensor 260. In instances, the secondary returned image 35*a*', 35*b* from the cover glass or surface of sensor 260 is centered on the image sensor 260 and also produces a low-level "ghost image" of the reticle 230.

Figure 5:
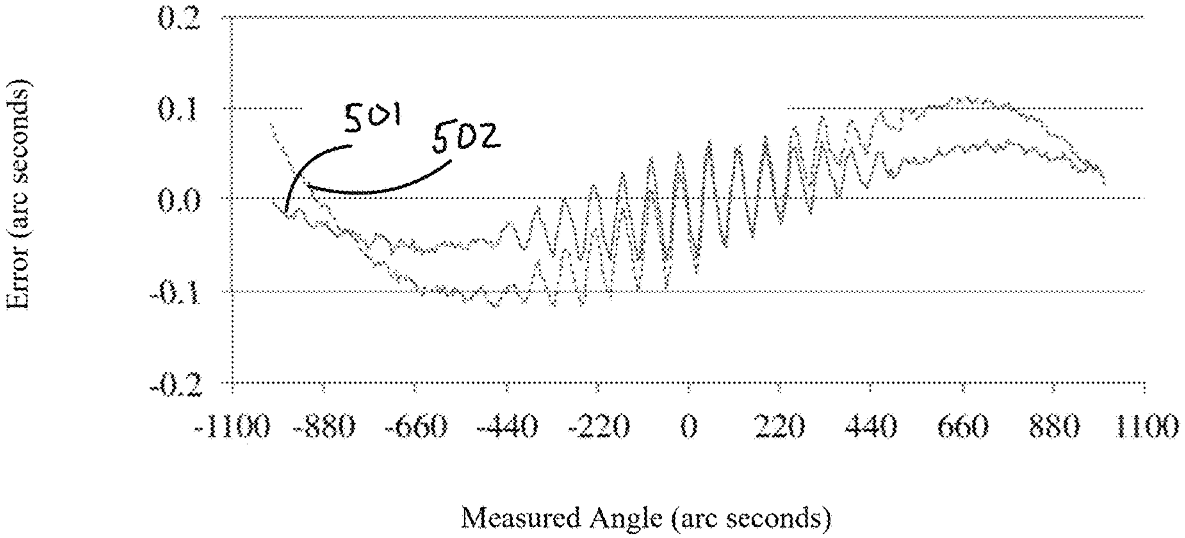
FIG. 5 is a graph of the measured error of a prior art autocollimator.
Figure 6:
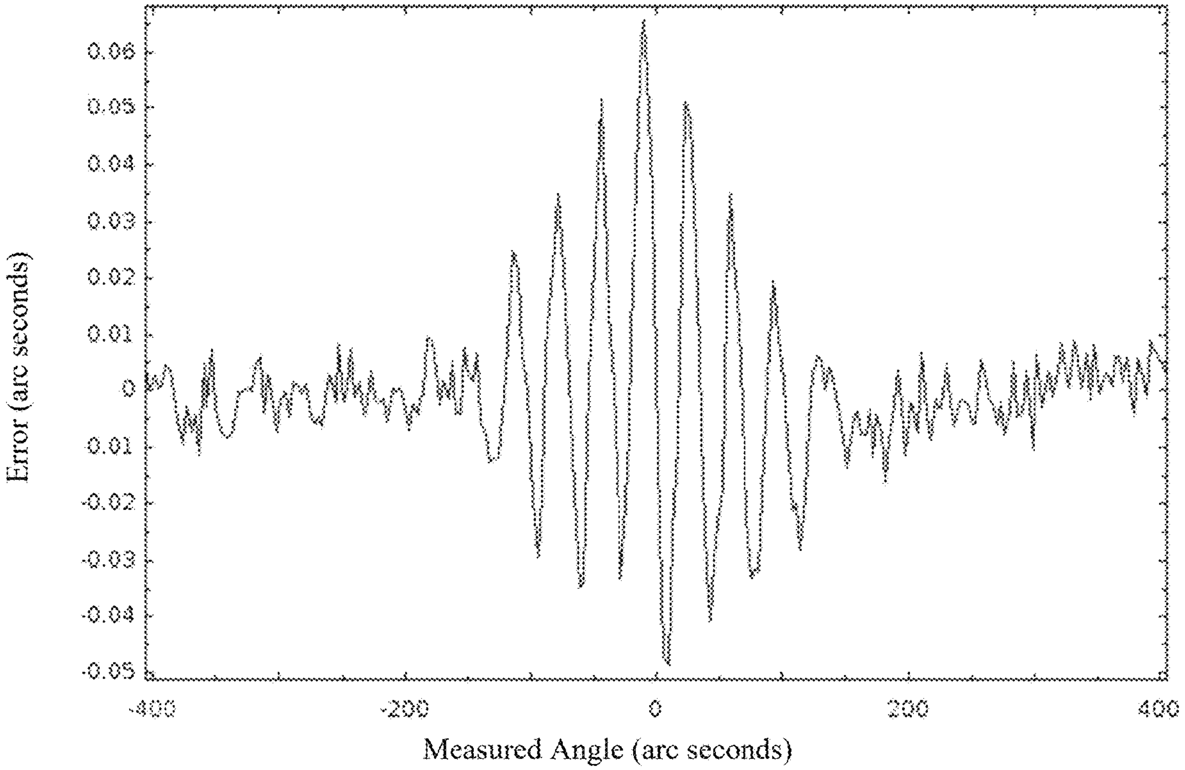
FIG. 6 is a graph of the measured error of another autocollimator.

These unwanted low-level images or secondary reflections, whether from the reticle 230 and/or the sensor 260, introduce a structured non-uniform background on the image sensor 260. As the angle of the test mirror 228 is changed, the desired returned image from the test mirror 228 sweeps across the image sensor 260. When that test mirror image 226 passes by the fixed residual "ghost image" 35*b*, the intensity values are augmented by the intensity values of the residual "ghost image" 35*b* by differing amounts depending on the position of the returned image 226. For instance, where a four lined reticle 230 is used with a linear sensor 60*a* as in FIG. 8, as the test surface 228 moves towards being perpendicular to the optical axis, the returned projected image 26' passes toward the center of the sensor 60*a*, and the measured intensity values of the desired image 26' are affected by the fixed secondary reflection 35*b*'. This leads to measurement errors when the returned image is near the fixed residual "ghost" image 35*b*'. For instance, the compounding or augmentation of both the primary image 26' and the secondary reflection 35*b*' results in additional intensity at some portions and lesser intensity at other portions, resulting in an oscillatory error about the center point as shown in FIG. 5 and FIG. 6. FIG. 5 shows residual errors of an autocollimator with a linear sensor and an eight-lined reticle. FIG. 6 shows residual errors of an autocollimator with a linear sensor and a four-lined reticle. It is applicant who has appreciated these oscillatory errors are caused by the secondary reflections noted herein. The interaction between the periodic reticle pattern and the fixed secondary reflection of the periodic reticle pattern produces the troublesome oscillatory errors near the center of the measurement range, as seen in FIG. 5 and FIG. 6.

Figure 10A:
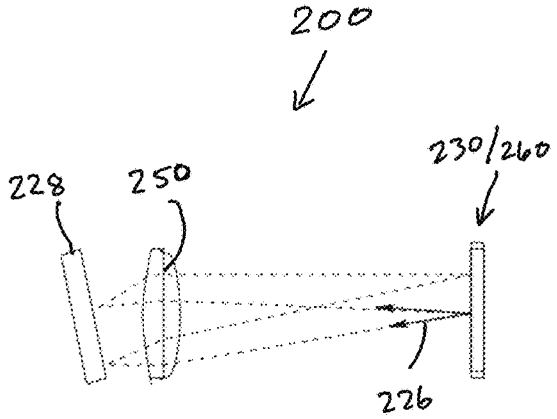
FIG. 10A-10D are schematic views, with elements removed or combined for clarity, of representative optical paths regarding prior art autocollimators.
Figure 10B:
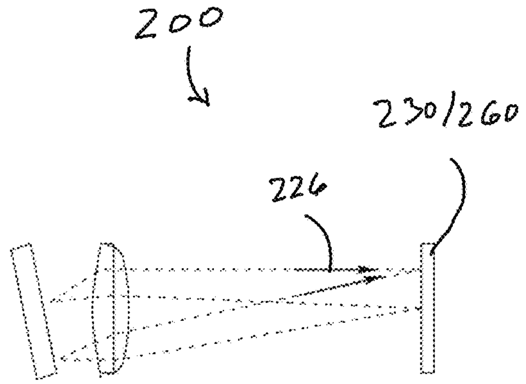
Figure 10C:
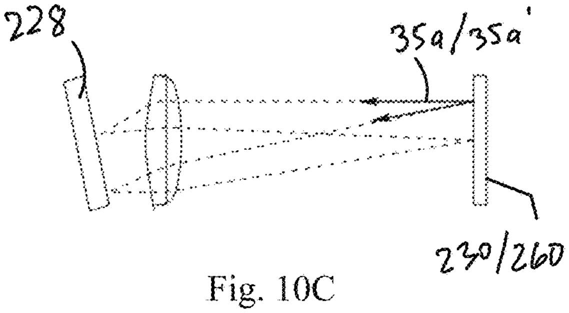

FIGS. 10A-10D further depict secondary reflections of an autocollimator 200. Elements of the autocollimator 200 are removed or combined for clarity and depict representative optical paths regarding prior art autocollimators. FIG. 10A shows autocollimator 200 with reticle 230 and sensor 260 superimposed, and beamsplitter 240 removed for clarity (indeed, the reticle and sensor align along the optical axis 134 so may effectively be presented as shown). Projected image 226 projects from reticle 230 toward test surface 228, and reflects back toward sensor 260 (and to reticle 230 via beam splitter 240) at FIG. 10B. FIG. 10C shows a portion of the image 226, represented now as reflected or secondary reflection 35*a*/35*a*' being reflected from the reticle 230 and sensor 260, respectively. An aspect of the invention is Applicant's discovery that unwanted secondary reflection

Figure 10D:
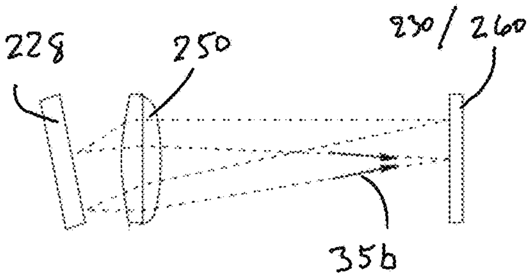

35*a*/35*a*' reflects back to sensor 260 via reflection from test mirror 228 as shown in FIG. 10D.

Further aspects of the invention include autocollimators, systems and methods for eliminating and/or reducing the secondary reflections which cause the errors and/or reducing or eliminating errors caused by the secondary reflections. In aspects, the invention includes means for preventing secondary reflections from surfaces at or near a focal plane of the objective lens from reaching the sensor and/or means for reducing (i.e., reducing an amount or an intensity of) secondary reflections from surfaces at or near a focal plane of the objective lens which reach the sensor. These means for preventing and/or reducing the secondary reflections prevent or reduce errors in the measured data. Accordingly, aspects of the invention also include means for reducing and/or preventing errors caused by secondary reflections.

Figure 11:
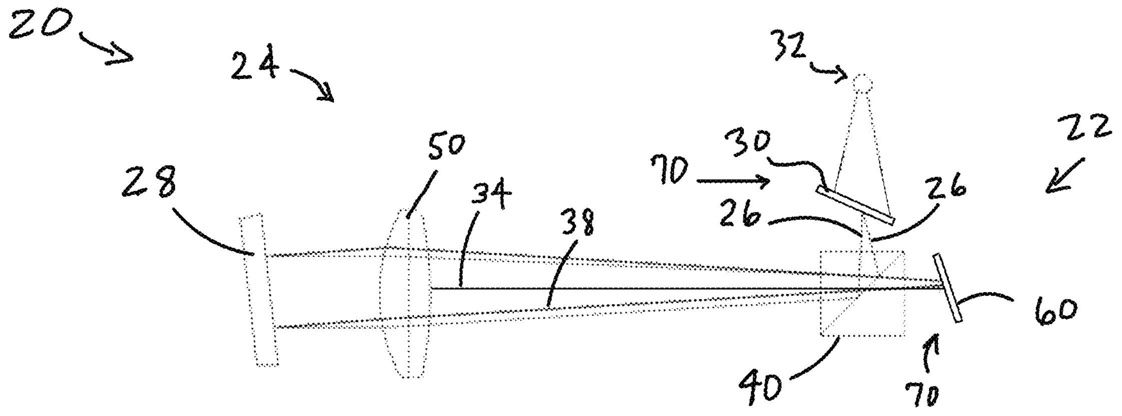
FIG. 11 is a schematic view of an autocollimator in accordance with one aspect of the present invention with portions removed for clarity and in conjunction with a test object.

FIG. 11 is a is a schematic view of an autocollimator 20 in accordance with aspects of the present invention with portions removed for clarity and in conjunction with a test object 28. Autocollimator 20 includes an image projector 22 and a telescope 24. A projected image 26 is reflected back to the autocollimator 20 by the test object 28, which in some aspects is a mirror or has a mirrored test surface. The tilt angle of the test surface 28 is to be measured. Light is projected from a light source 32 which passes through a reticle 30 as the projected image 26. The projected image 26 is reflected off beam splitter 40 (via a diagonal therein) and passes through an objective lens 50. The total distance from the reticle 30 to the objective lens 50 is set to be the focal length of the objective lens 50, so the light 26 passing through a single point on the reticle 30 will be projected out from the objective lens 50 along parallel lines. For instance, the projector 22 projects the image of the reticle 30 to "infinity." A return optical path 38 through the telescope 24 is from the test mirror 28 back through the objective lens 50, straight through the beam splitter 40 to an electronic detector 60 or eyepiece. The telescope portion 24 focuses the reflected image of the reticle 30 on to the sensor 60. The distance from the objective lens 50 to the image sensor 60 is set to be the focal length of the objective lens 50, so the telescope portion 24 is also focused at infinity. The position of the reflected image 26 on the sensor 60 is used to determine how much the test mirror 28 is tilted away from being perpendicular to the optical axis 34 of the autocollimator 20. The optical axis 34 is a line or path along which light propagates through the system, and typically passes through a center of curvature of each surface. If the mirrored test surface 28 is exactly perpendicular to the optical axis 34, the reflection will be back in exactly the same direction, and the reticle image 26 will be centered on the image sensor 60. If the mirrored test surface 28 is slightly tilted, the reticle image 26 will be correspondingly offset from the center of the sensor 60 (or the image will move as compared to a prior reference position). The beam splitter 40 is used to superimpose the optical axis 34 of the projector portion 22 and the telescope portion 24 of the autocollimator 20. Consequently, the placement of the reticle 30 and light 32, on the one hand, and the sensor 60, on the other hand, can be interchanged. The beam splitter 40, in one aspect is a prism beam splitter as shown. In other aspects the beam splitter is a plate beam splitter or other beam splitter.

As also shown in FIG. 11, and with reference to FIGS. 12A-C and FIG. 13, the light source projector 22 and/or the measuring telescope 24 are configured to prevent secondary reflections 35*a* of the projected image 26 (reference light) from reaching sensor 60. For instance, FIG. 12A, FIG. 12B and FIG. 12C indicate how tilting the reticle 30 and/or sensor 60 prevents secondary reflections from the reticle 30 and/or sensor 60 from returning to the test surface 28 and re-entering the autocollimator 20. The tilt angle shown in these figures is exaggerated for clarity. It may be appreciated that only a slight tilt of the reticle 30 may be sufficient.

In one aspect autocollimator 20 includes means for preventing 70 which prevents the secondary reflections 35*a* from reaching sensor 60. Means for preventing 70 in one aspect includes a planar surface of the reticle 30 oriented such that the secondary reflection 35*a* is reflected away from the optical axis 34, thereby preventing secondary reflection of the reference light from traveling back to the test object 28 and back to the sensor 60. For instance, means 70 includes reticle 30 (or a planar surface of reticle proximal the beam splitter) being tilted or otherwise oriented such that reflections are not directed along the optical axis 34 or are not otherwise directed back to the test object 28 and return to the sensor 60. In aspects, the planar surface of reticle 30 is oriented such that all secondary reflections are prevented from reaching the sensor 60. In other aspects, and as further defined herein, autocollimator 20 includes means for reducing 80 an amount or intensity of secondary reflections impacting the sensor 60 where the means for reducing 80 include a planar surface oriented such that a sufficiently reduced amount or intensity of secondary reflections 35 reach the sensor 60 (or represent a diffuse reflection from the surface at the focal plane) such that those secondary reflections 35 are inconsequential to the measurement.

Figure 13:
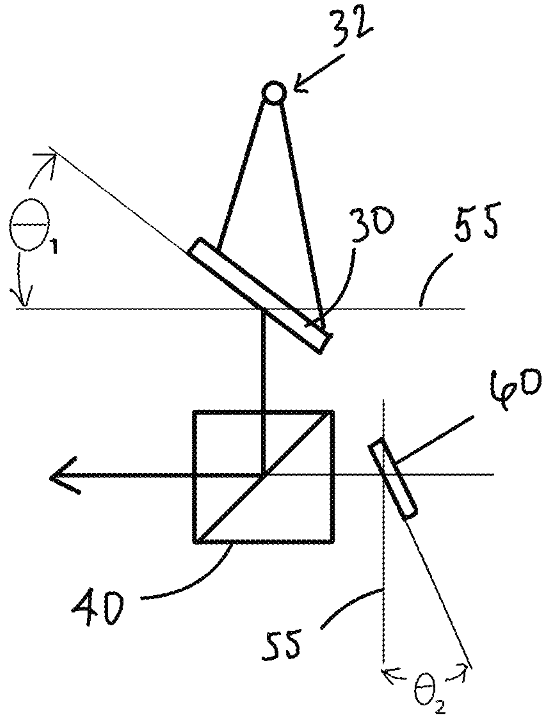
FIG. 13 is a schematic view of components of the autocollimator of FIG. 11.
Figure 12A:
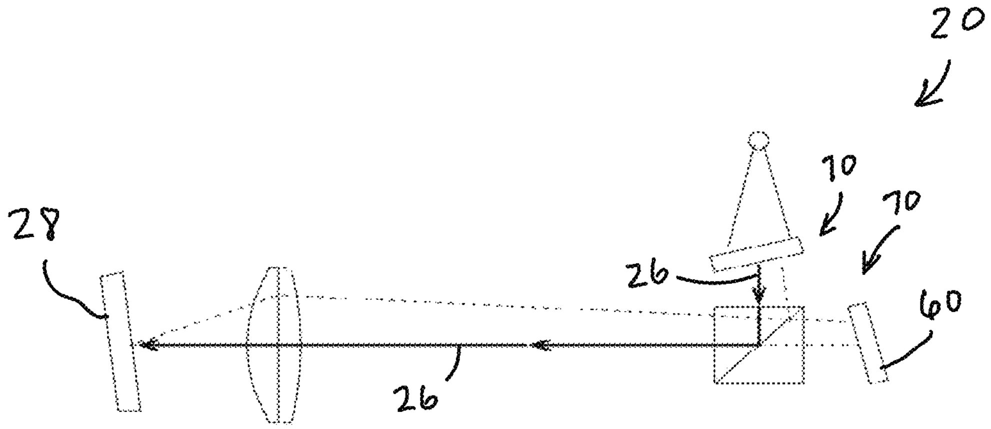
FIG. 12A-12C are schematic views in accordance with device, system and methods aspects of the invention.
Figure 12B:
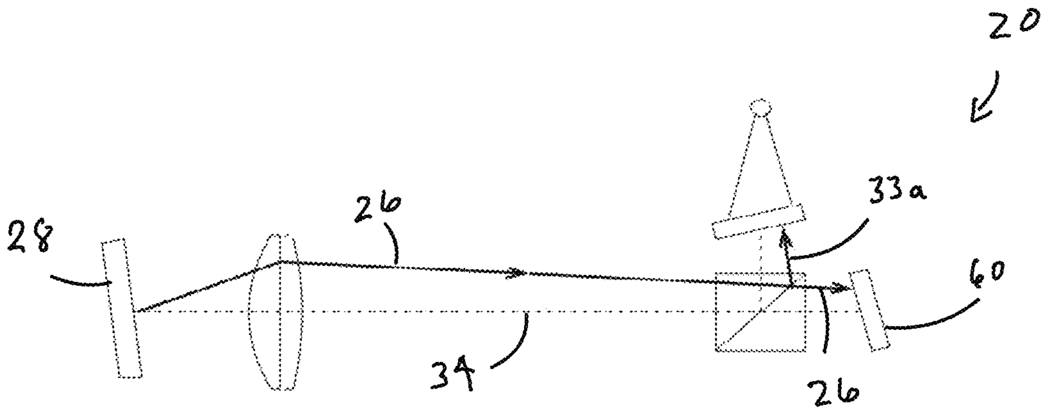
Figure 12C:
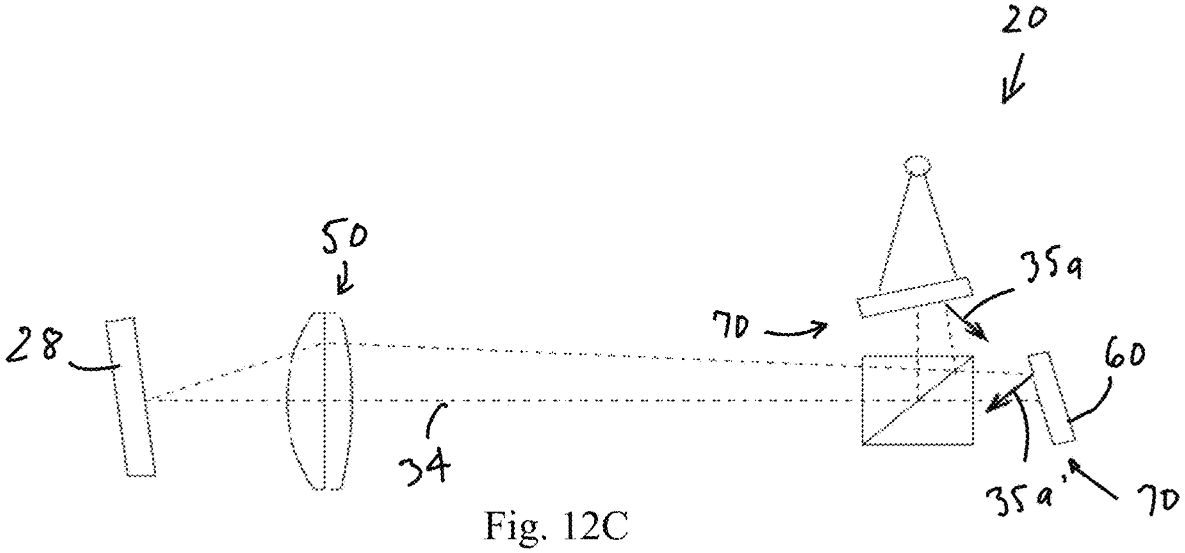

In one aspect with respect to FIG. 13, reticle 30 has a planar surface proximal the beam splitter 40, which planar surface is oriented at an angle, theta 1, with respect to a perpendicular to the optical axis 34. The tilt angle theta 1 is highly exaggerated for illustration. While the reticle 30 in FIG. 13 is shown tilted away from sensor 60, it may be appreciated that reticle 30 may also be tilted in an opposite direction and even toward sensor 60 as shown in FIGS. 12A-C. Likewise, sensor 60 has a planar surface proximal the beam splitter 40, which planar surface is oriented at a angle, theta 2, with respect to a perpendicular to the optical axis 34. The tilt angle theta 2 is highly exaggerated for illustration. The actual tilt of tilt angles theta 1 and theta 2 are typically on the order of a few degrees depending on the focal length and aperture of the objective lens 50. While the sensor 60 in FIG. 13 is shown tilted away from reticle 30, it may be appreciated that sensor 60 may also be tilted in an opposite direction and even toward reticle 30. For instruments with linear sensors 60 and corresponding reticles 30, the tilts, T1, T2, can be made about horizontal and vertical axes (See FIG. 3C, 3D) to minimize the effect on instrument calibration. In aspects, the planar surface proximal the beamsplitter 40 is oriented such that no reflection or minimal reflection travels to sensor 60. In further reference to FIG. 13, it may be appreciated that the focal plane 55 of lens 50 is represented by the reference axis for angles theta 1 and theta 2.

Figure 3A:
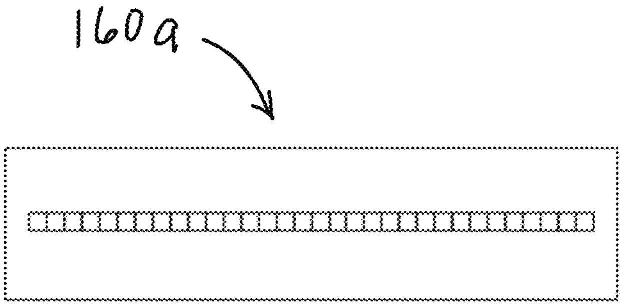
FIG. 3A is a schematic view depicting a representative prior art linear sensor.
Figure 3B:
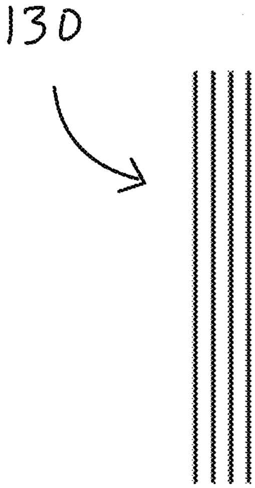
FIG. 3B is a schematic view depicting a representative prior art reticle.
Figure 3C:
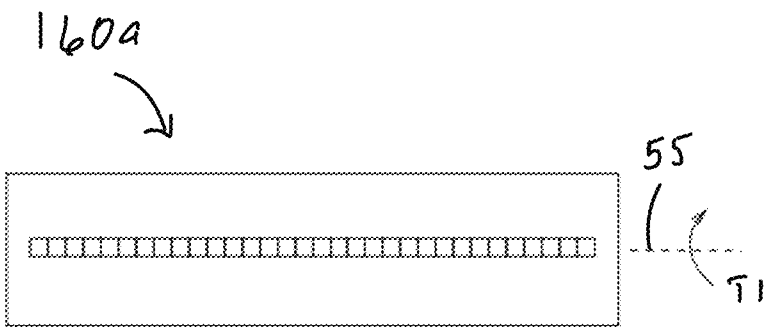
FIG. 3C is a schematic view depicting a representative linear sensor and tilt axis in accordance with one aspect of the invention.
Figure 3D:
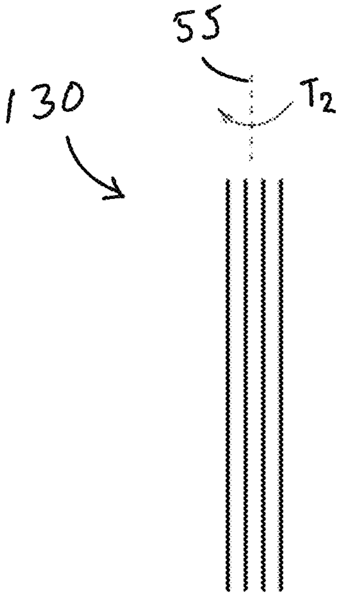
FIG. 3D is a schematic view depicting a representative reticle and tilt axis in accordance with one aspect of the invention.
Figure 4:
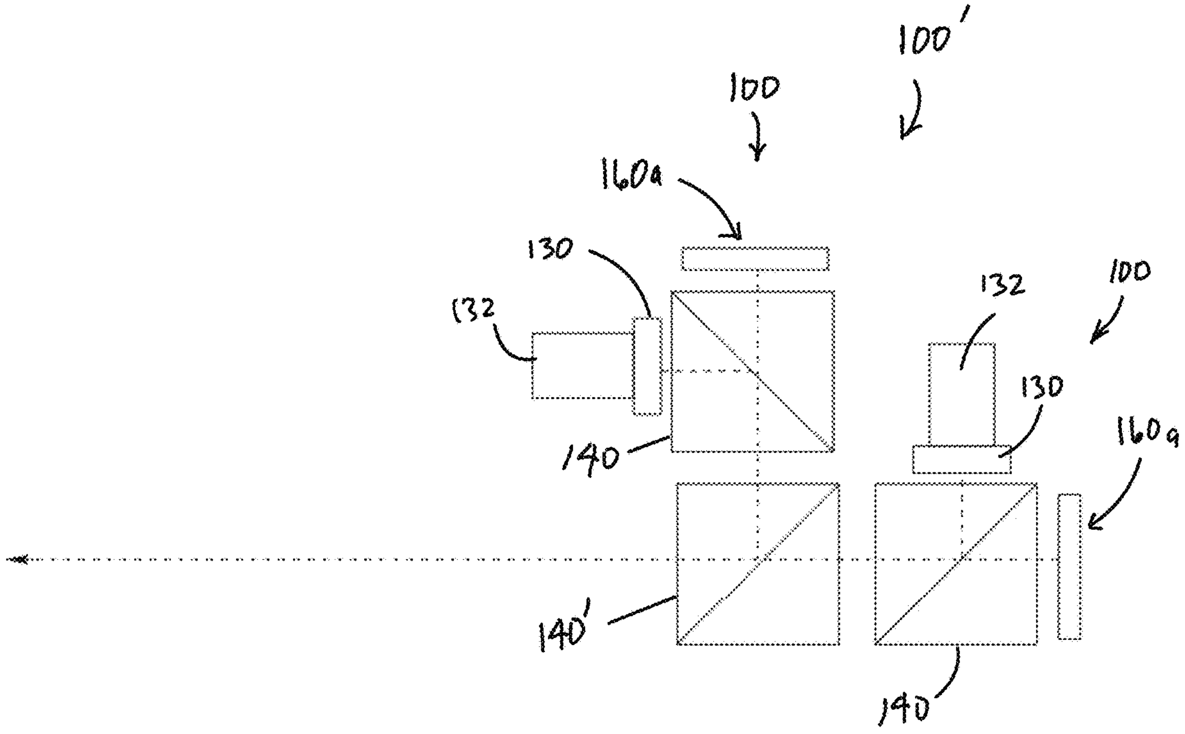
FIG. 4 is a schematic view of a representative prior art autocollimator.

In further aspects and with respect to FIG. 3C and FIG. 3D, the rotation angles T1 and T2 indicate tilt of the reticle 130 and sensor 160*a*, respectively, in such a way as to deflect the unwanted secondary reflections 35*a*, 35*a*' off their surface away from the optical axis 134. It may be appreciated that one or the other, or both, of the reticle 130 and/or sensor 160*a* may be tilted to deflect the unwanted reflections away from the optical axis 134. In one example utilizing one dimensional sensor 160*a* and the reticle 130, the tilt can be easily accomplished without substantially affecting the operation of the autocollimator 20, and traditional autocollimators may be retrofitted or adjusted by making the tilt or tilts. The same may be accomplished where sensor 160 is an area sensor or two-dimensional sensor or screen. While tilting an area sensor and corresponding reticle can also solve the secondary refection problem, a more complicated calibration process is required since different parts of the sensor are moved out of the focal plane by differing amounts. In one example, as with FIG. 3C, where the tilt axis and focal plane 55 coincide, pixels of the sensor 160*a* remain in the focal plane 55 even though the sensor 160*a* is tiled at angle T1, so no change is needed to calibration of the autocollimator. Regarding FIG. 3D, where the reticle is configured for measuring rotation of a test surface about a vertical axis, because the tilt at angle T2 of the reticle 130 is of only a few degrees, the off-center lines on the reticle 130 would only shift out of the focal plane 55 by a negligible amount (approximately less than 0.001 inches). Here again, a traditional autocollimator may be retrofitted in accordance with the invention by making the desired tilt or tilts, and little or no recalibration of measurements is required yet the unwanted secondary reflections are eliminated or reduced.

Figure 14:
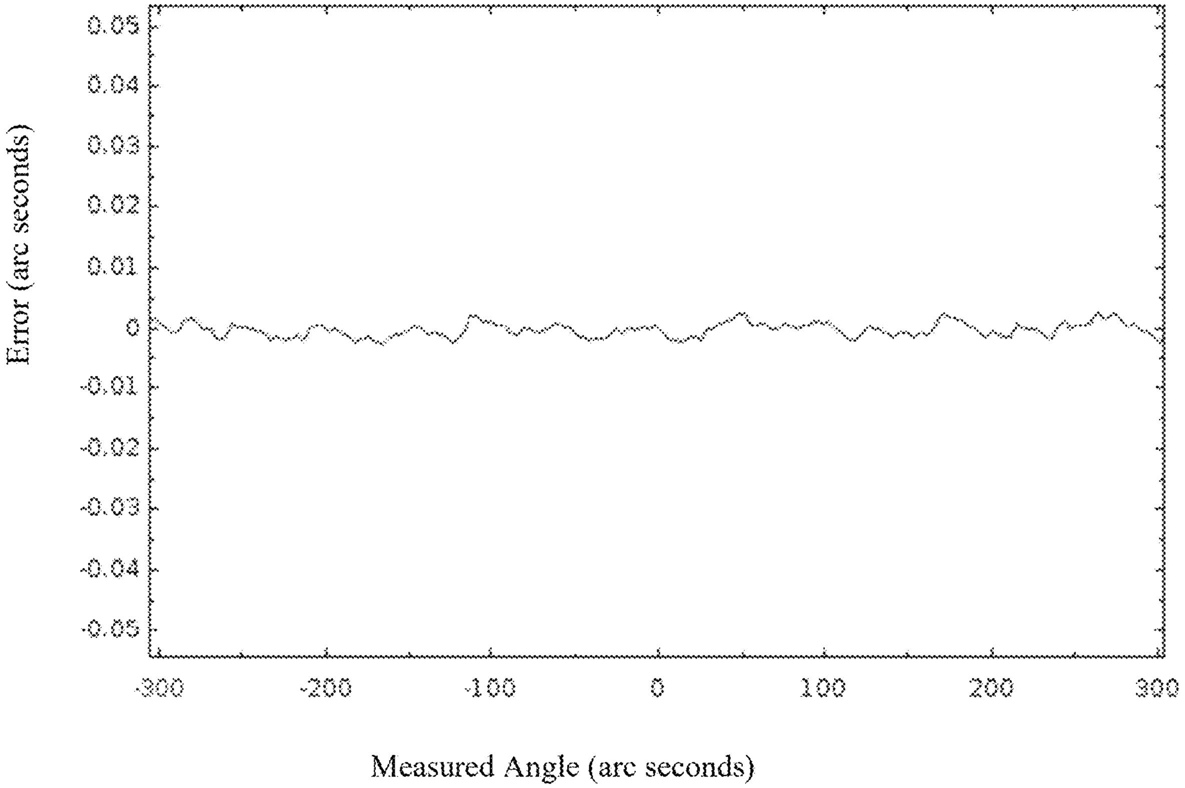
FIG. 14 is a graph of the measured error of an autocollimator in accordance with the present invention.

FIG. 14 is a graph showing residual errors after calibration of autocollimator 20 constructed in accordance with the invention. The autocollimator 20 in this representative example included a set-up where both an area sensor 60 and a corresponding reticle 30 were tilted from being perpendicular to the optical axis. In one testing example, the reticle 30 and sensor 60 were both tilted about 2 degrees off from being perpendicular to the optical axis 34. The graph shows the autocollimator errors (in arcseconds) for tilt angles of the test surface between −300 and 300 arcseconds. The residual errors are minimal, with very little variation from the zero amplitude. This example shows the present invention and autocollimator 20 having eliminated and/or sufficiently reduced measurement errors due to secondary reflections. The results shown in FIG. 14 are significant compared to those shown in an autocollimator as in FIG. 6.

Figure 15A:
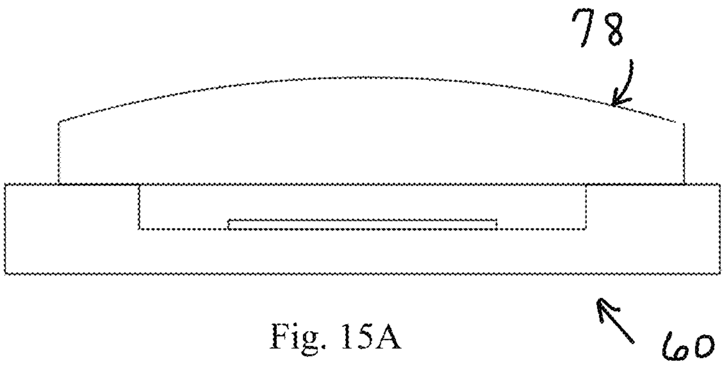
FIG. 15A-15C are schematic views in accordance with devices, systems and method aspects of the invention.
Figure 15B:
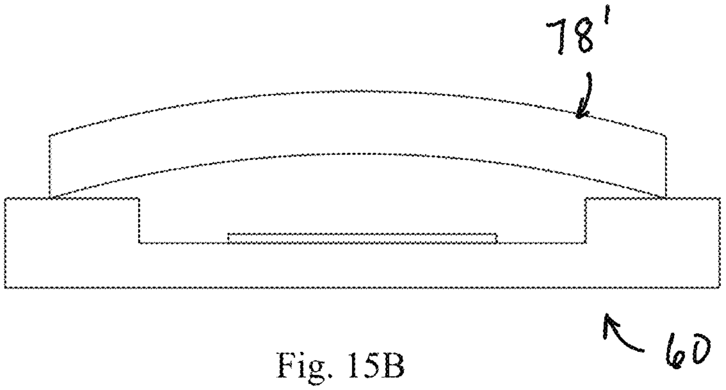

In addition to the aforementioned tilting, means for preventing 70 in other aspects includes a cover glass having or defining a curved lens 78 which directs or redirects secondary reflections 35 away from the sensor 60. For instance, the curved lens 78 may include a simple long focal length plano convex, or plano concave lens with the planar side facing the sensor 60 as shown in FIG. 15A. This arrangement has minimal effect on the focal length of the autocollimator 20. There is even less effect on the focal length where the planar side of the lens is positioned at or nearly at the surface of the sensor 60. Some minor adjustment of the position of the sensor 60 may be desired to account for any change of focal length if needed. In some cases a new calibration may be required. The curved lens 78' may also include a meniscus lens cover glass as shown in FIG. 15B. While lens 78' is more expensive than lens 78, it may be more effective given the absence of a planar surface perpendicular the optical axis 34. In the case of the curved lens 78 being associated with the sensor 60, the curved lens 78 may be fixed on the cover plate or cover glass 62 itself, or may replace the cover glass 62. In further aspects, means for preventing 70 include a reticle 30 having or defining a curved lens 78 which directs or redirects secondary reflections 35 away from the sensor 60. For instance, the curved lens 78 may include a simple long focal length plano convex, or plano concave lens with the planar side facing the reticle 30. This arrangement has minimal effect on the focal length of the autocollimator 20. There is even less effect on the focal length where the planar side of the lens is positioned at or nearly at the surface of the reticle 30. Some minor adjustment of the position of the reticle 30 may be desired to account for any change of focal length if needed. In some cases a new calibration is required. The means for preventing 70 may also be considered means for reducing 80.

Figure 15C:
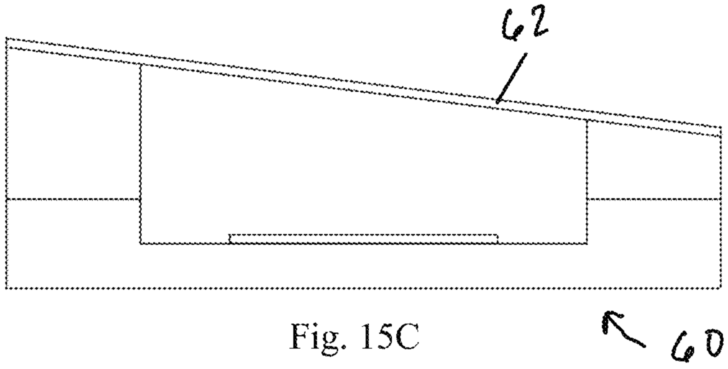

In further aspects, means for preventing 70 includes a planar surface of the sensor 60 (or a cover plate 62 of sensor 60) oriented such that the secondary reflection 35*a'* is reflected away from the optical axis 34, thereby preventing secondary reflection of the reference light from traveling back to the test object 28 and back to the sensor 60. For instance, means 70 includes sensor 60 (or a planar surface of sensor 60 proximal the beam splitter 40) being tilted or otherwise oriented such that reflections are not directed along the optical axis 34 or are not otherwise directed back to the test object 28 and return to the sensor 60. The angled cover glass 62 shown in FIG. 15C, shown with a greatly exaggerated angle, is one example, and may have an advantage of not requiring recalibration of the autocollimator 20. In aspects, the planar surface of sensor 60 (or cover plate 62) is oriented such that all secondary reflections are prevented from reaching the sensor 60. In other aspects, and as further defined below, autocollimator 20 includes means for reducing 80 an amount or intensity of secondary reflections impacting the sensor 60 where the means for reducing 80 include a planar surface of the sensor or cover glass of the sensor oriented such that a sufficiently reduced amount or intensity of secondary reflections 35 reach the sensor 60 such that those secondary reflections 35 are inconsequential to the measurement.

Figure 16A:
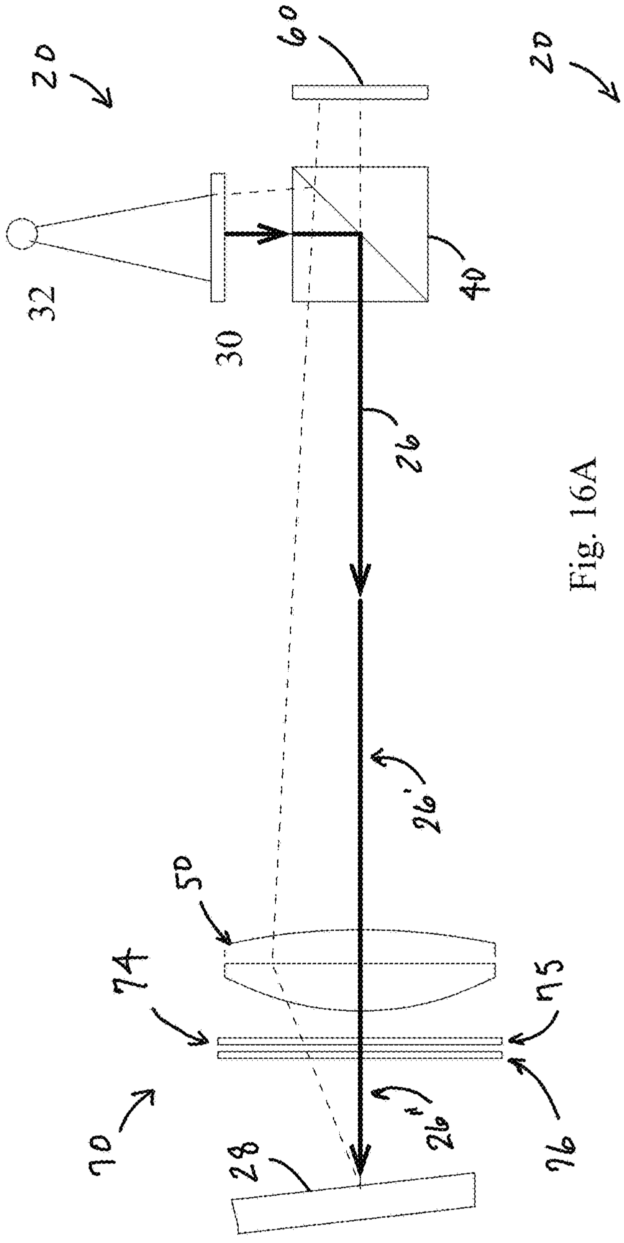
FIGS. 16A-16C are schematic views in accordance with devices, systems and method aspects of the invention.
Figure 16B:
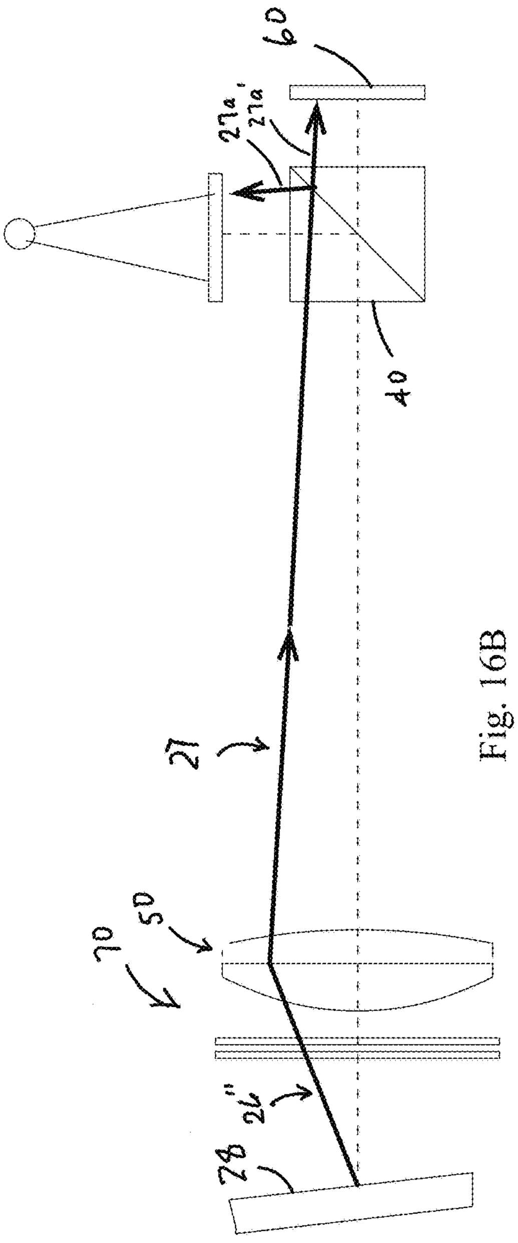
Figure 16C:
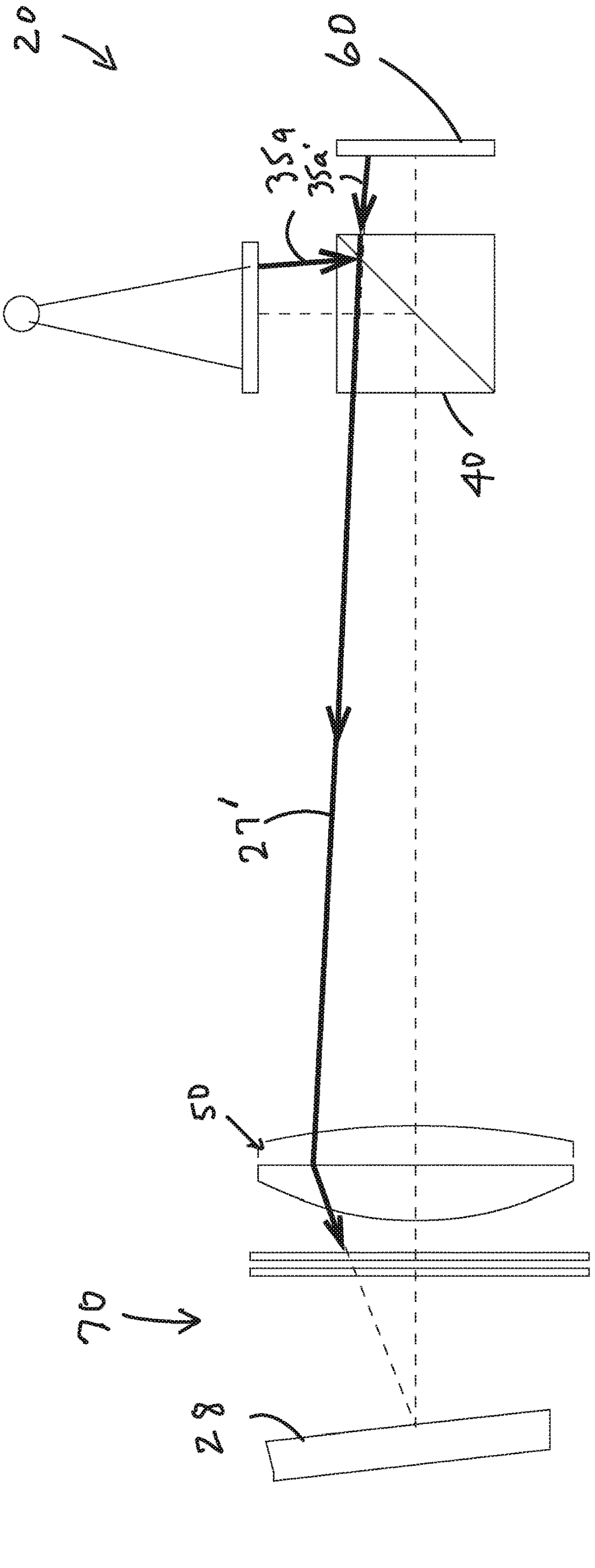

In further aspects with respect to FIGS. 16A-C, the invention includes an autocollimator 20 having means for preventing 70 which prevents the secondary reflections 35 from reaching sensor 60. Means for preventing 70 in one aspect includes circular polarizer 74 such that the secondary reflection 35 (See FIG. 16C) is prevented from traveling back to the test object 28, and thereby prevented from traveling to the sensor 60. In one aspect, circular polarizer 74 includes a quarter wave plate 75 and a linear polarizer 76. Particularly, the quarter wave plate 75 is positioned proximal objective lens 50 while linear polarizer 76 is positioned distal objective lens 50. As such, light of the projected image 26 travels from the light source 32 and through reticle 30, through beam splitter 40 and toward and through objective 50 as unpolarized light 26'. The quarter wave plate 75 is situated behind the objective lens 50 and such that there is no polarization of the unpolarized light 26' incoming to the quarter wave plate 75. Light passing through linear polarizer 76 toward test surface 28 becomes linearly polarized light 26". This linearly polarized light 26" reflects off test surface 28 back through linear polarizer 76 and also through quarter wave plate 75 where the quarter wave plate 75 causes the linearly polarized light 26" to become circularly polarized light 27. This circularly polarized light 27 will have a handedness (whether right handedness or left handedness) as it passes the quarter wave plate 75. For the purposes of illustration only, assume circularly polarized light 27 has left handedness. As the light 27 travels through the beam splitter 40, a portion 27*a'* passes to the sensor 60 while a portion 27*a* is reflected toward reticle 30 (See FIG. 16B). As shown in FIG. 16C, the portion 27*a* is reflected back from reticle 30 as secondary light 35*a*, which in this case is polarized light 27'. The polarized light 27' has revered handedness compared to polarized light 27 due to an odd number of reflections at the beam splitter 40 and the reticle 30 (or due to the odd number of reflections at the beam splitter 40 and the sensor 60). In this illustration, the handedness of polarized light 27' is right handedness. Because of the opposite handedness, the polarized light 27' is blocked at the circular polarizer 74. Thus, the secondary reflection 35*a* of the reticle 30 (or the secondary reflection 35*a*' of the sensor 60 as the case may be) is unable to reach the test surface 28 and thereby unable to travel back to the sensor 60 to cause an unwanted "ghost image." Preventing the secondary reflection from impacting sensor 60 provides improved measuring for autocollimator 20. Likewise, as shown in FIG. 16C, the portion 27' is reflected back from the sensor 60 as secondary light 35*a*', which in this case is polarized light 27'. The polarized light 27' is right handedness and is unable to reach the test surface 28 and unable to cause an unwanted "ghost image."

In further aspects, circular polarizer 74, and/or a planar surface of the circular polarizer 74, is oriented such that reflections from a planar surface of circular polarizer 74 are directed away from the optical axis 34 or otherwise do not impact sensor 60.

In further aspects, means for preventing 70 may include positioning circular polarizer 74 at a variety of other locations. For instance, polarizer 74 may be positioned on autocollimator 20 at an outside surface of autocollimator 20 (as an external component, and/or as an add-on or retrofit to existing autocollimators). The polarizer 74 and autocollimator may then be situated so that the polarizer is in the path of travel of light 26' exiting the autocollimator (i.e., between a test surface 28 and a housing or other component of autocollimator 20). Polarizer 74 may also be positioned in front of the reticle 30 and/or in front of the sensor 60 (i.e., between the reticle 30 and beam splitter 40, or between the sensor 60 and beam splitter 40). In further aspects, polarizer 74 may be split into components with a polarizing beam splitter 40' (i.e., a beam splitter which itself includes polarizing properties) together with a separate quarter wave plate 75 positioned by the objective lens 50 (whether the wave plate 75 is between the lens 50 and beam splitter 40', or between the lens 50 and a test object 28). Other arrangements may also be utilized where the quarter wave plate 75 and linear polarizer 76 are separated or placed at various positions within autocollimator 20. In other aspects, and as further defined below, autocollimator 20 includes means for reducing 80 an amount or intensity of secondary reflections impacting the sensor 60 where the means for reducing 80 include a circular polarizer 74 as presented above such that a sufficiently reduced amount or intensity of secondary reflections 35 reach the sensor 60 such that those secondary reflections 35 are inconsequential to the measurement. In aspects, the secondary reflections from surfaces at or near a focal plane of the lens are eliminated or reduced to be the same as or lower than a baseline level of noise of the autocollimator.

Figure 17A:
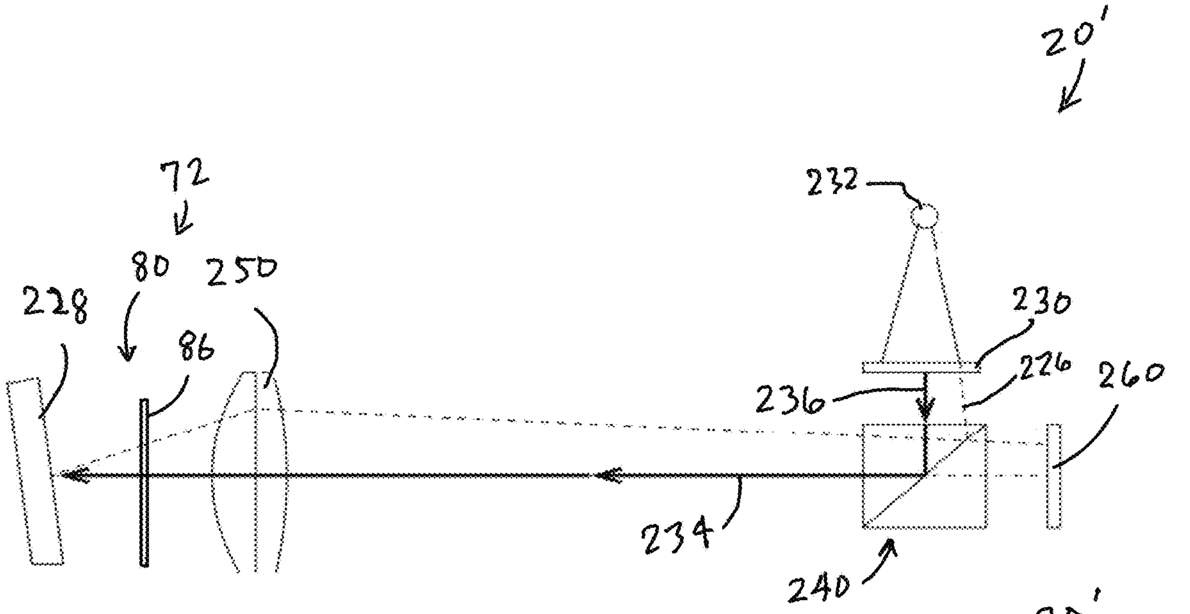
FIGS. 17A-17D are schematic views in accordance with devices, systems and method aspects of the invention.
Figure 17B:
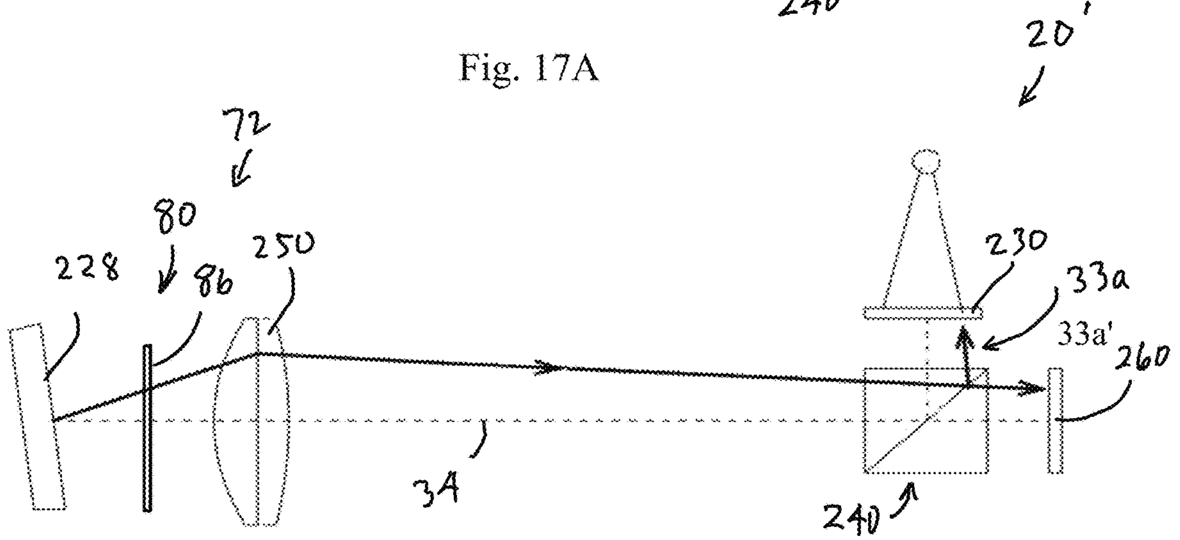
Figure 17C:
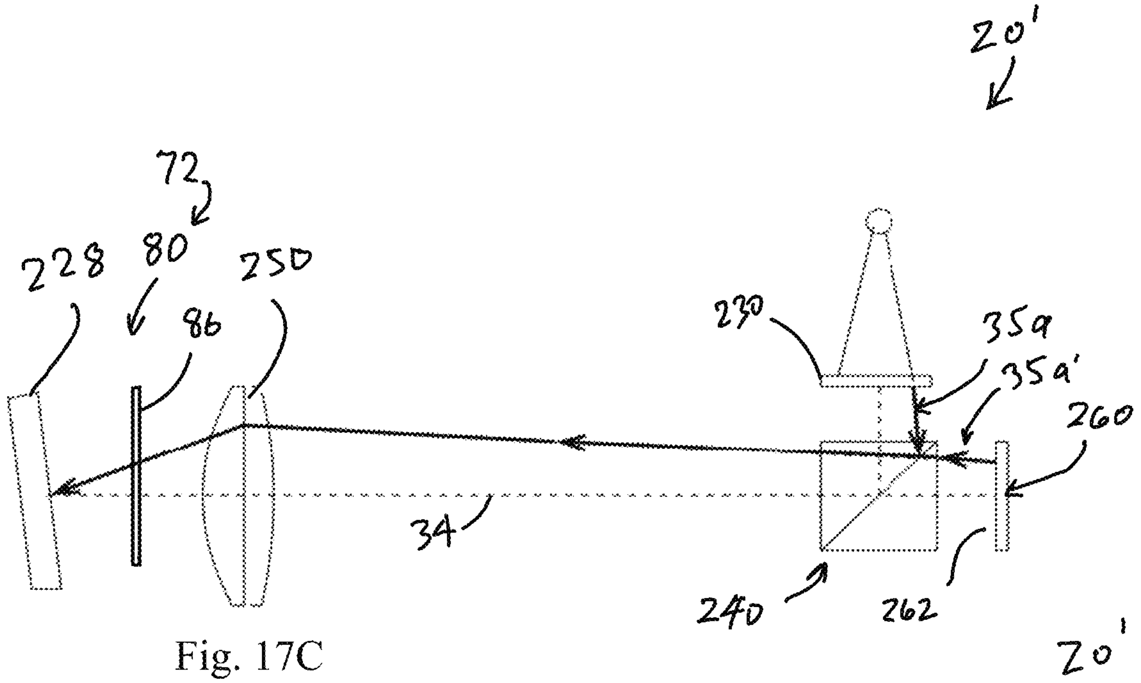
Figure 17D:
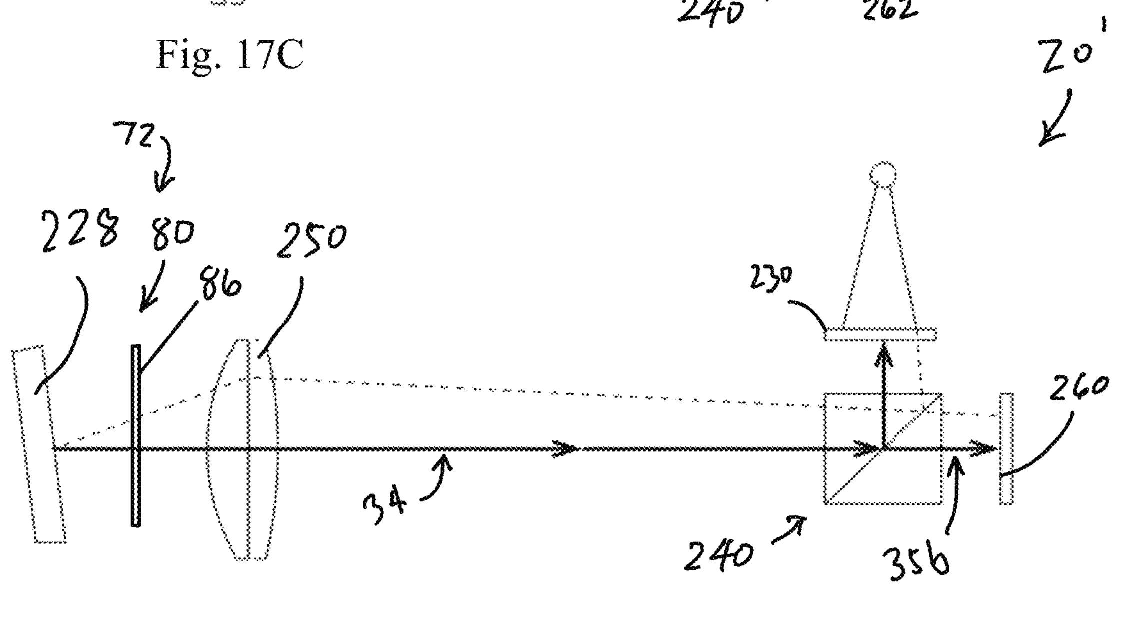

A further aspect of the invention includes means for preventing errors 72 caused by secondary reflections or errors that would otherwise be caused by secondary reflections. Such means for preventing 72 include means for preventing secondary reflections 70 and means for reducing 80 secondary reflections which satisfy the goal of reducing or eliminating identifiable measurement errors. In aspects, means for preventing errors 72 includes means for reducing 80 which includes a neutral density filter 86 (See FIG. 17C and FIG. 17D representing the secondary reflection 35 of FIG. 9A-D traveling back to sensor 260). Neutral density filter 86 is positioned between lens 250 and the test mirror 228. In this position the neutral density filter 86 also serves as an easily replaceable lens protector for the objective lens 250 (which usually requires factory service to replace). In other aspects, the neutral density filter 86 may be positioned between lens 250 and beam splitter 240, or between reticle 230 and beam splitter 240 or between sensor 260 and beam splitter 240. Neutral density filter 86 reduces intensity of light along the optical path 34. The filter 86 reduces or modifies the intensity of all wavelengths, or colors, of light equally. Filter 86 may include a variable neutral density filter. Assume the autocollimator 20' of FIG. 17A does not include means for preventing 70 and/or reticle 30 and/or sensor 60 having a tilted surface (such that secondary reflections 35 travel back through beam splitter 40 toward lens 50). Because the secondary reflections 35 would already be weakened or comprise less light intensity by virtue of being reflected twice, the intensity of these secondary reflections 35 are low compared to the desired primary or projected image 26 (thus producing a "ghost image" of the reticle 230). While the neutral density filter 86 attenuates all signals, the secondary reflection signal(s) 35*a* and 35*a*' must pass through the neutral density filter two more times before reaching the sensor, compared to the desired signal 33*a*'. Consequently, the intensity of the secondary reflection signal is reduced relative to the intensity of the desired signal. Depending on the circumstances, the neutral density filter 86 may sufficiently reduce the secondary reflections 35 such that they are rendered too weak in comparison to the stronger projected image 26 so that sensor readings are not disrupted. In other circumstances, if the neutral density filter 86 does not sufficiently reduce the secondary reflections 35, those secondary reflections 35 may still disrupt the sensor readings. A variety of different strengths of neutral density filters 86 may be utilized depending on the degree of attenuation needed to sufficiently reduce the unwanted secondary reflections from disrupting the measurement. If a secondary reflection 35*b*' is weak yet still disrupts the readings (by presenting, for instance, a periodic or oscillating error, or identifiable aberration), a stronger neutral density filter 86 or filters 86 may be utilized to further attenuate the secondary reflection 35*b*' so that its presence, if it still exists, does not disrupt the readings. In some instances, a relatively strong neutral density filter 86 may not be desired if the primary or desired signal 26 is too weakened to provide sensor data. In such cases alternative preventing means 70 or reducing means 80 may be utilized as provided herein. Such alternative means allow for a higher intensity of light while still eliminating or sufficiently reducing the intensity of the secondary reflection 35*b*'. It may be appreciated that means for reducing errors 80 caused by secondary reflections include means for preventing 70.

In accordance with one hypothetical example, assume filter 86 reduces the intensity of the transmitted light by a factor of 50%. Also assume the desired signal 26 has amplitude 100 units at sensor 60 and the secondary reflection 35 has amplitude 1 unit after bouncing back to the sensor 60 without the neutral density filter 86. After introduction of filter 86. the projected image 226 would be reduced by a factor of 2 as it travels through the neutral density filter 86 on its way to the test mirror 228 in FIG. 17A. After reflecting off the test mirror 228 the projected image 226 is reduced by a factor of 2 again as it travels through the neutral density filter 86 on its way back to the beam splitter 240 in FIG. 17B. By the time it reaches the sensor 260 (and reticle 230) the amplitude would be reduced by a factor of 4, to 25 units. However, while the desired signal 226 is reduced by a factor of 4, so are any secondary reflections 35*a*, 35*a*' from the reticle 230 or sensor 260. As the light from those reduced secondary reflections 35*a*, 35*a*' travels back towards the test mirror 228 again (FIG. 17C) it is further reduced by a factor of 2 by the filter 86. Finally, as that light reflects from the test mirror 228 back to the sensor 260 (FIG. 17D) it is reduced by yet another factor of 2. Overall this yields a "ghost image" having an intensity that is reduced by a factor of 16 relative to the original unfiltered case.

Use of filter 86 results in a change of the signal-to-noise ratio from 100 to 400 assuming the unwanted secondary reflection 35 is the only "noise" of the system. This is surprising, because usually introducing losses will lower the signal-to-noise ratio. The key in this case is that the source of the light (or noise) is the unwanted secondary reflection 35. In accordance with aspects of the invention, because the secondary reflection 35 passes through the filter 86 a second time (actually, a third and fourth time as shown in FIG. 17C and FIG. 17D), the loss of its intensity is much greater than the loss of intensity of the desired light 226. It may also be appreciated that lowering the overall intensity of the light source 32 and resulting lower intensity of projected image 226, when passed through filter 86 as shown in FIGS. 17A-D, will allow a sufficient intensity of the desired light 226 to pass to sensor 260 while the unwanted secondary reflection 35 will be sufficiently reduced such that no meaningful signal augmentation errors occur or are detected at the sensor 260. The intensity levels of light 226 and or the power of filter 86 may be adjusted to a desired threshold so that a sufficient intensity of light 226 is received at sensor 260 to make accurate readings while the intensity of the secondary reflection 35 is sufficiently low so as to be irrelevant or insignificant to the readings. A traditional autocollimator 200 may be retrofitted according to autocollimator 20' to solve the problems associated with secondary reflection 35.

Figure 18A:
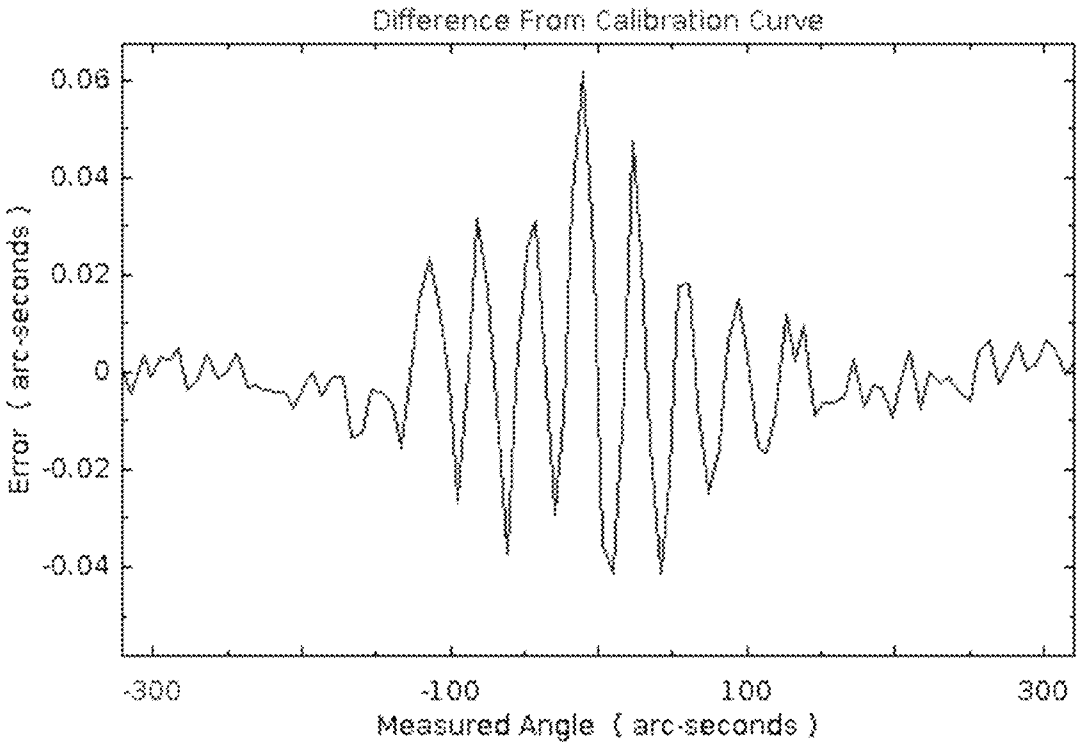
FIG. 18A is a graph of the measured error of an unmodified autocollimator.
Figure 18B:
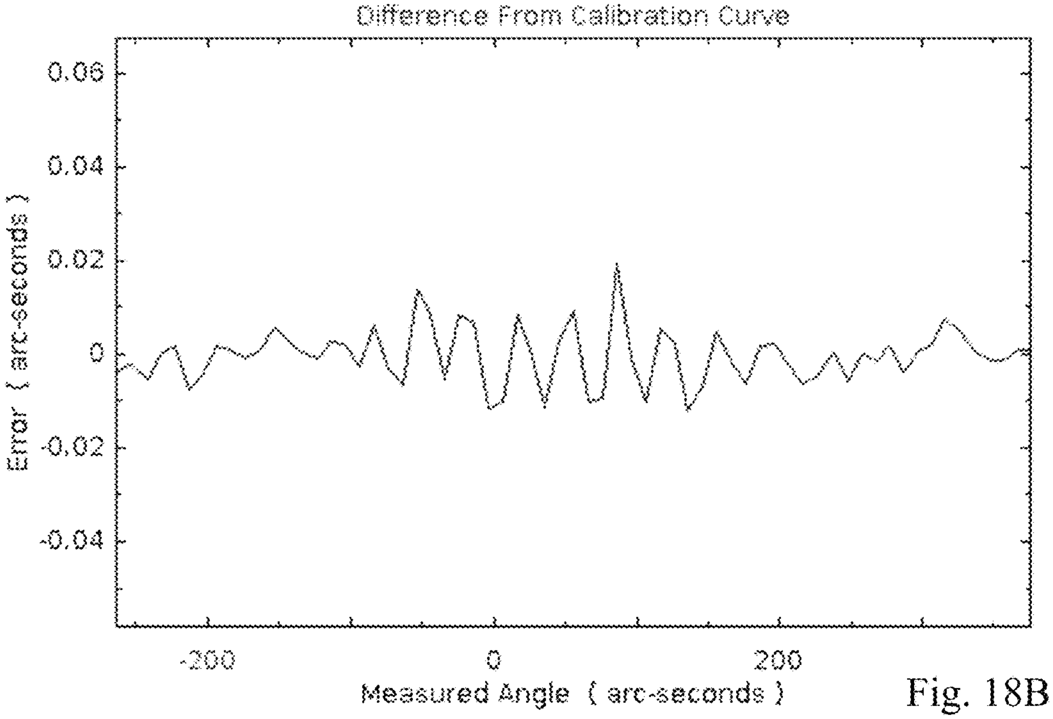
FIGS. 18B-18C are graphs of the measured error of an autocollimator in accordance with the present invention.
Figure 18C:
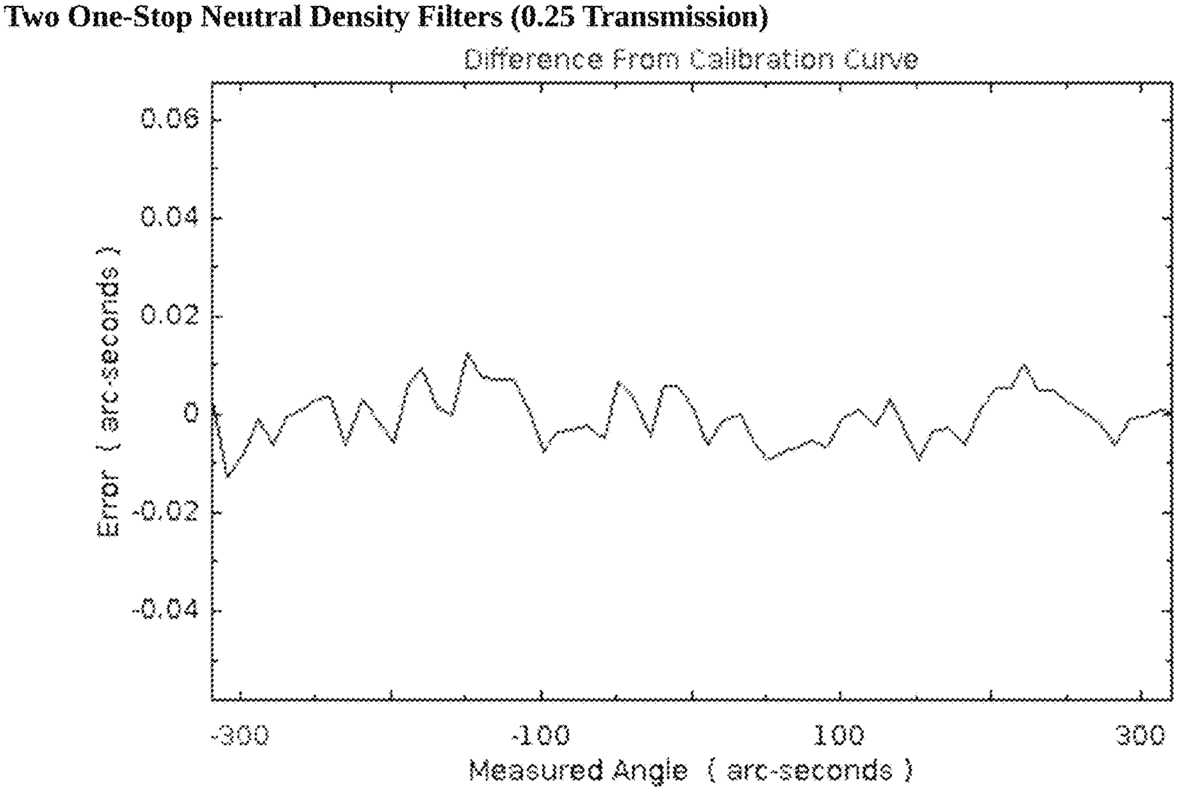

FIG. 18A is a chart showing data when undertaking an example test of the autocollimator 20', but without the filter 86. Note the similarity with the data of FIG. 6. This test was conducted on an Elcomat 3000 autocollimator with a reticle 30 having 4 vertical lines. The graph shows a pattern of oscillatory error from the secondary reflection. FIG. 18B shows a graph of the data when utilizing the filter 86. In this example filter 86 was an inexpensive neutral density filter having 1-stop, meaning it reduced the light passing through it by a factor of 2. FIG. 18B shows a significant reduction in the oscillatory error from the secondary reflection, without noticeable additional errors overall. FIG. 18C is a graph showing data from autocollimator 20' with a neutral density filter 86 having 2-stop, meaning it reduced the light passing through it by a factor of 4. In this instance two inexpensive 1-stop filters 86 were stacked. This graph shows the oscillatory error eliminated, yet the overall error level (non-uniformity) appears to have increased a bit. It may be appreciated that a higher quality 2-stop singe filter (not stacked) might produce even better results with respect to the overall error level. A different neutral density filter 86 having more or less filtering ability may be used for a particular application depending on a determination of how much light is needed to obtain decent readings.

It may be appreciated that neutral density filter 86 may be positioned external device 20, 20', such as being positioned at an exterior surface of the device to cover the opening where the light projects outward toward test object 228. A traditional autocollimator may therefore be easily retrofitted with filter 86 externally, or filter 86 may be included within a housing of an autocollimator. Such easy retrofit provides remarkable improvement, at low cost, to the test results due to reduction or elimination of the impacts of the secondary reflections. If higher intensity light is needed, the autocollimator may also, or alternatively, use the tilt or other features presented herein. When positioning the neutral density filter 86 in front of the lens it is best to tilt the filter 86 by a small amount so that reflection from the neutral density filter 86 does not interfere with the measurement. Since the filter 86 is in the collimated beam, the surfaces of the filter 86 can act as reflective test surfaces, so it should be tilted enough that its tilt angle is outside the measurement range of the autocollimator.

Figure 19A:
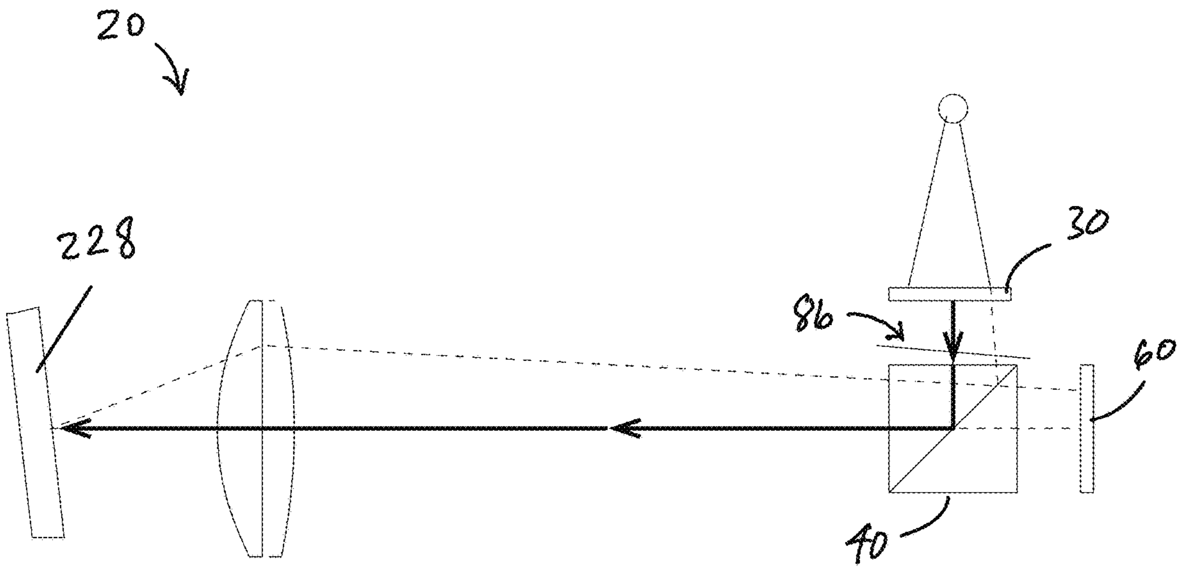
FIGS. 19A-19C are schematic views in accordance with devices, systems and method aspects of the invention.
Figure 19B:
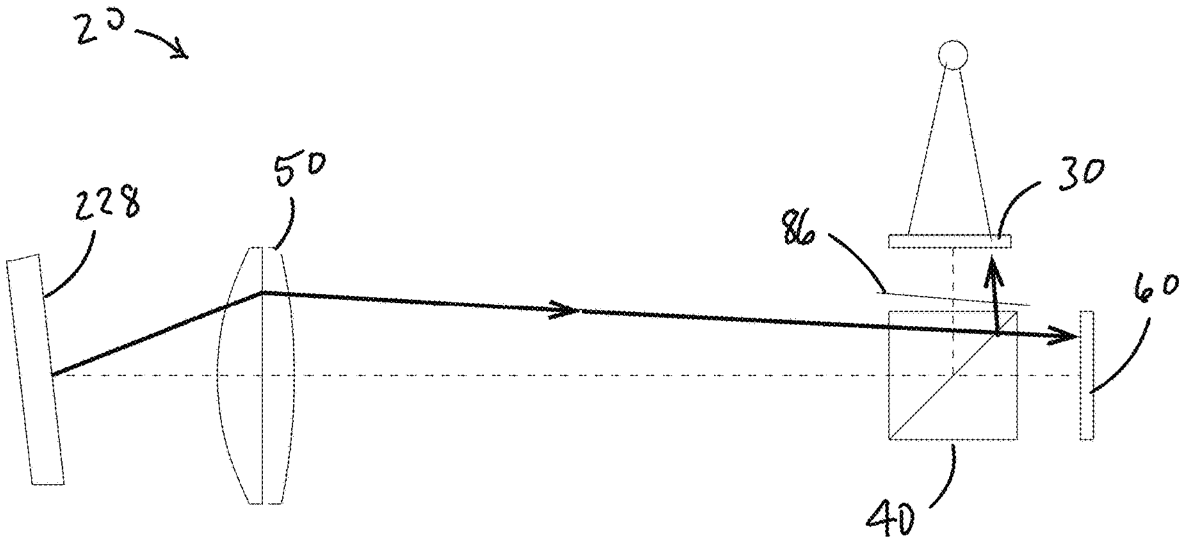
Figure 19C:
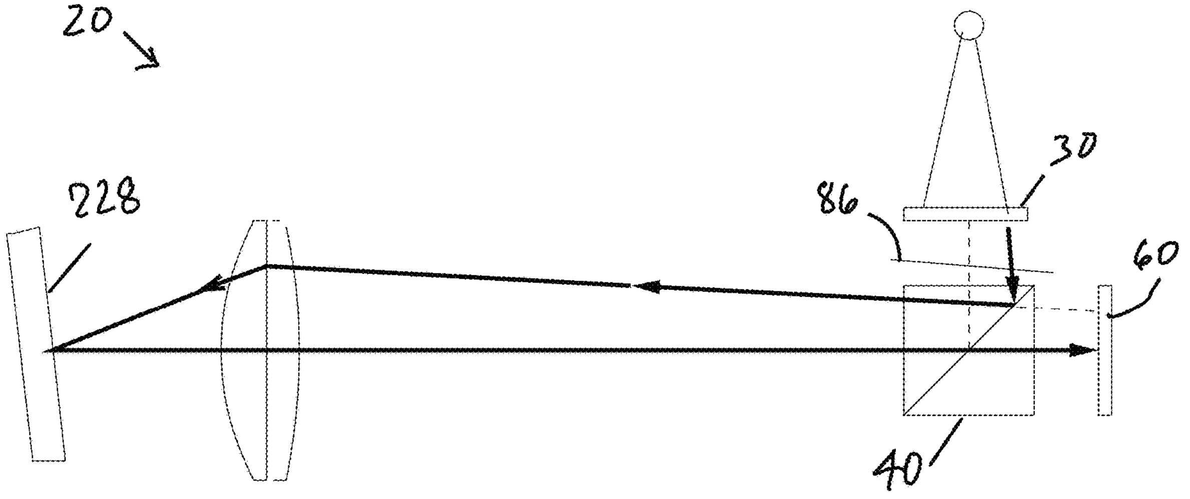

In a case where a significant secondary reflection occurs from the reticle 30 or from the sensor 60, but not from both, it is advantageous to place the neutral density filter 86 between the beam splitter 40 and the source of the significant secondary reflection. FIG. 19A-C show a neutral density filter 86 positioned between the beam splitter 40 and reticle 30. In FIG. 19A, light from the reticle to the test surface 228 is attenuated a first time by the filter 86. FIG. 19B shows the desired reflection returning directly to the image sensor without further attenuation (thus maintaining a more vibrant intensity) while light returning to the reticle 30 is attenuated a second time by the filter 86. Significant ghost reflection from the reticle 30 is attenuated a third time by passing through the filter 86 again, as shown in FIG. 19C, and before reaching sensor 60. The ghost reflection from the sensor 60 is not further attenuated, but it was assumed to be insignificant at least compared to the secondary reflection from the reticle 30, so further attenuation is not needed.

Figure 20:
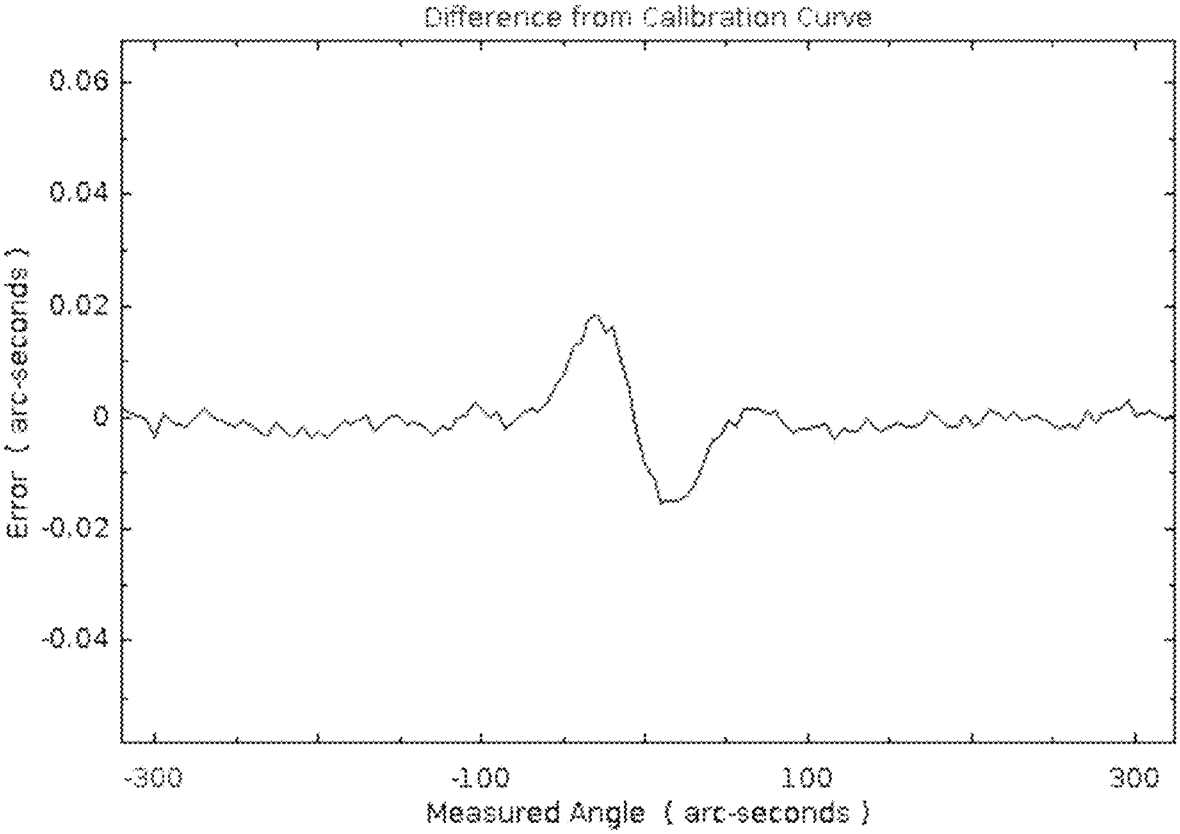
FIG. 20 is a graph of the measured error of an autocollimator in a particular arrangement.
Figure 21:
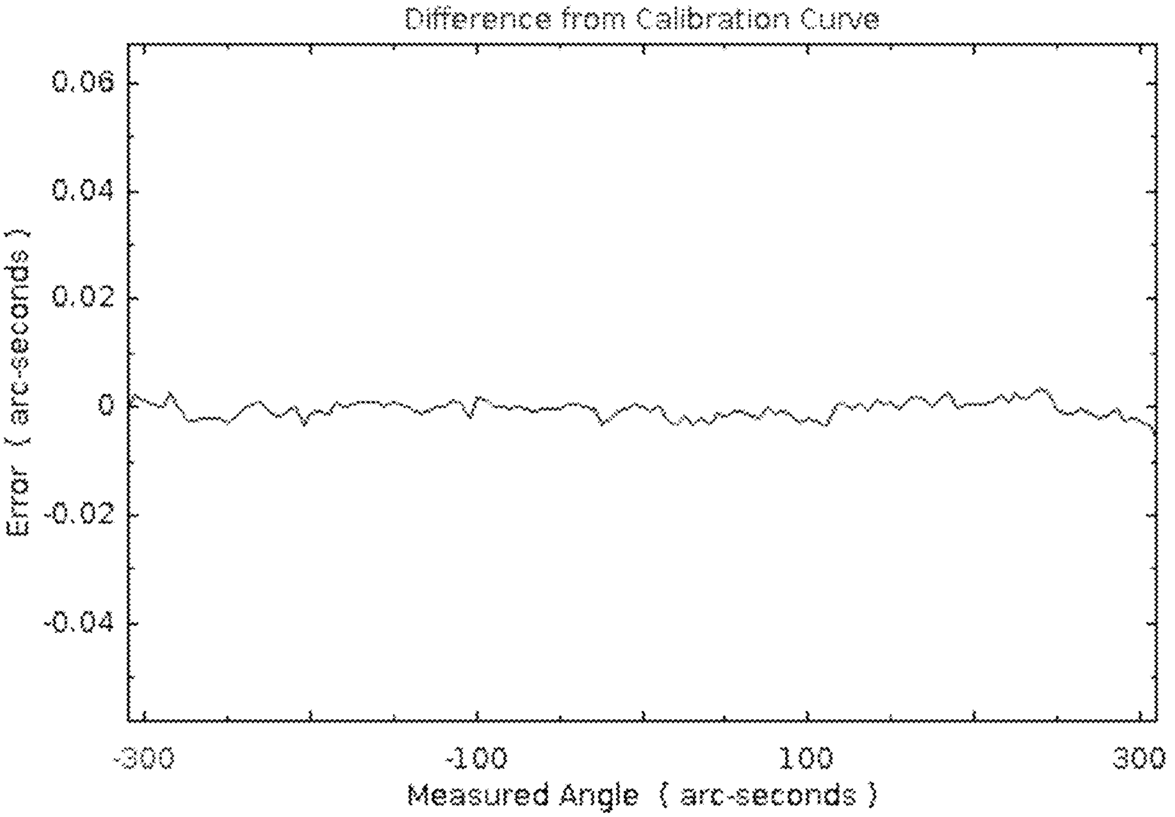
FIG. 21 is a graph of the measured error of an autocollimator in accordance with the present invention.

FIG. 20 is a graph showing the measured error curve from an autocollimator arranged so there is a significant secondary reflection from the reticle 230, but not the sensor 260. The reticle 230 does not have a periodic pattern, so it has only a single relatively low-level spike where the desired returned image passes over the ghost image. For instance, if the reticle has a cross-hair configuration, as single wave or wrinkle will be presented as in FIG. 20. In this example, a 1-stop (0.5 transmission) neutral density filter 86 was added between the reticle 230 and the beam splitter 240. The filter 86 was also shifted away from the reticle 230 to keep it away from the focal plane, and tilted slightly so as to avoid creating an additional ghost image of its own. The resulting error measurement is shown in the data of FIG. 21. It may be appreciated that the intensity of the ghost image was reduced enough so it no longer introduced a significant error. An advantage to placing the filter 86 between the source of the ghost reflection and the beam splitter 240, rather than by the objective lens 250 in this case is that the desired reflection is only reduced by a factor of 2 (only one pass through the filter 86) while the ghost reflection is reduced by a factor of 8 (three passes through the filter 86). That is, in this case the signal to noise ratio still improves by a factor of 4, as it would have by placing the filter 86 in front of the objective lens 250, but the desired signal is only reduced by a factor of 2 instead of 4 (with the filter 86 near the objective lens 250). See FIGS. 19A-C. A similar occurrence would be presented for a case where the only significant secondary reflection occurs from the sensor 60. In other cases, and where the secondary reflections are from only one of the reticle 30 or the sensor 60, a circular polarizer 74 as noted above may be used as an alternative, and in a similar configuration as that of the filter 86. For instance, placing the circular polarizer 74 between the beam splitter 40 and the reticle 30, with the quarter wave plate 75 facing the reticle 30, would prevent secondary reflections from the reticle 30 from returning to the test object 228 and sensor 60.

Figure 22A:
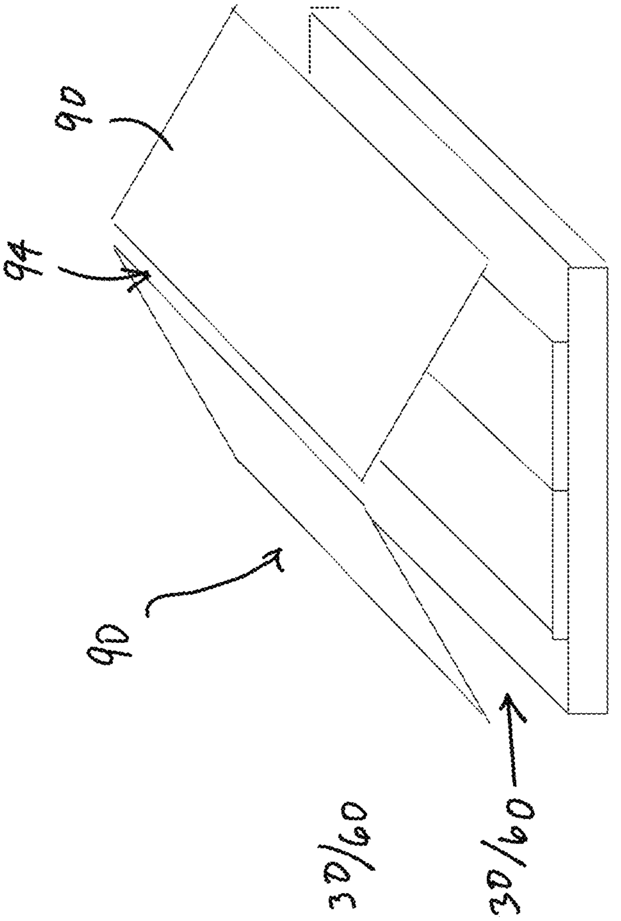
FIG. 22A is a perspective view of a component for use in conjunction with devices, systems and methods of the invention.
Figure 22B:
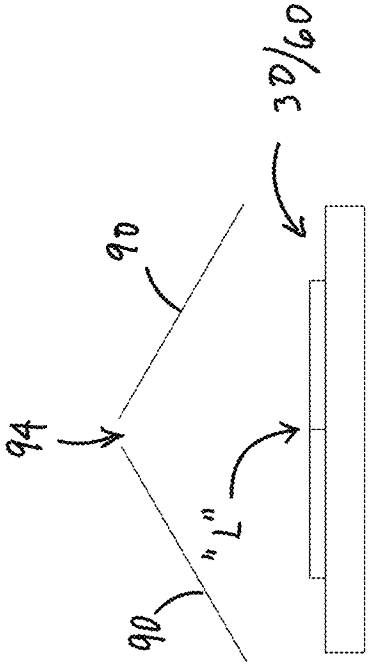
FIG. 22B is a front view of the component of FIG. 22A.

In further aspects, means for preventing 70 or means for reducing 80 include use of a baffle 90 positioned slightly in front of the sensor 60 and/or the reticle 30. In aspects the baffle 90 is positioned between the beam splitter and the sensor and/or between the beam splitter and the reticle. As shown in FIG. 22A and FIG. 22B a set of baffles 90 may be positioned over a linear sensor 60 or reticle 30 such that a narrow gap 94 provides access for light to enter and contact sensor 30. A great amount of light coming from the test surface is blocked by the baffled 90 (and/or deflected and/or out of focus so that reflection and/or scattering from the baffle 90 is insignificant). Referring to FIG. 8, the light 26' reflected from the test surface traveling to the sensor, absent a baffle 90, could reflect and/or scatter off the full width of the sensor 60*a* (or anything else in the focal plane). When baffle 90 is placed over the sensor 60, the desired light will reach the sensor pixels unobstructed through the gap 94 in the baffle, while the rest of the returning, unwanted light is deflected by the baffle 90. A baffle 90 positioned over the reticle 30 works similarly. The desired light traveling from the reticle passes through the gap 94 unobstructed, but most of the light initially reflected from the test surface is deflected by the baffle, thus avoiding the problem of secondary reflection from most of the surface of the reticle 30. Baffles 90 are tilted so that light is directed away from the linear sensor or reticle. The gap 94 is aligned to coincide with the line "L" of the reticle 30 and/or linear sensor 60. As shown in FIG. 22B, the line "L" is representative of a single or multiple parallel lines of the reticle or sensor, while just one line "L" is shown in the Figure. The gap 94 is very small, yet positioned wide enough to avoid vignetting.

In further aspects, means for preventing 70 includes a planar surface of the beam splitter 40 oriented such that the secondary reflection 35*a'* is reflected away from the optical axis 34, thereby preventing secondary reflection of the reference light from traveling back to the test object 28 and back to the sensor 60. For instance, where one or more faces of the beams splitter are close enough to the focal plane that secondary reflections come from the beams splitter faces, means 70 includes beam splitter 40 having a planar surface or surfaces proximal the focal plane 55 of the objective lens 50 being tilted or otherwise oriented such that reflections are not directed along the optical axis 34 or are not otherwise directed back to the test object 28 and return to the sensor 60. In aspects, the planar surface or planar surfaces of beam splitter 40 are oriented such that all secondary reflections are prevented from reaching the sensor 60. In other aspects, autocollimator 20 includes means for reducing 80 an amount or intensity of secondary reflections impacting the sensor 60 where the means for reducing 80 include a planar surface or surfaces of the beam splitter 40 oriented such that a sufficiently reduced amount or intensity of secondary reflections 35 reach the sensor 60 such that those secondary reflections 35 don't matter (i.e., such that those secondary reflections 35 are inconsequential to the measurement or do not result in meaningful measurement errors).

In a further aspect, a neutral density filter coating may be applied to a face of the beamsplitter 40 to reduce the intensity of the secondary reflection (instead of using a separate neutral density filter). In yet a further aspect, a polarizing film or films may be applied to a face of the beamsplitter 40 to implement a polarization solution as noted herein, instead of using separate optical elements. In yet a further aspect, the sensor 60 and/or reticle 30 of an autocollimator 20 are positioned very close to the focal plane of the lens 50. In even further aspects, the reticle 30 is in direct contact with a face of a prism beam splitter, or is presented as an opaque coating on a face of the beamsplitter 40. Where a face of the beam splitter 40 is so close to the focal plane that secondary reflections from that face of the beam splitter 40 are causing unwanted secondary reflections, then tilting the beam splitter 40 so that face is not perpendicular to the optical axis may be helpful to reduce or eliminate secondary reflections, much like tilting the sensor 60 and/or reticle 30.

Under aspects of the invention, the errors due to secondary reflections are eliminated or sufficiently reduced such that there is no or very minor evidence of the secondary reflections shown in the data. For instance, while FIG. 5, FIG. 6, FIG. 18A and FIG. 20 show measured results having oscillatory errors (or in the case of FIG. 20, a single wrinkle), use of the means 70, 80, tilts, filters, polarizers, baffles and other aspects presented herein effectively reduce or eliminate the errors as demonstrated in FIG. 14, FIG. 18B, FIG. 18C and FIG. 21. In some aspects, the errors are reduced or eliminated such that a baseline level of noise of the autocollimator is all that is detected as in FIG. 14 and FIG. 21. No discernable erroneous wrinkle or pattern of secondary reflection (error) is found. In these instances, the means for eliminating or reducing the errors cause those secondary reflections to be at or lower than a baseline level of noise of the autocollimator. In other aspects, a reduction may nonetheless be substantial where the errors are reduced while still appearing to be present and/or above/below the baseline level of noise. For instance, if the oscillatory error is reduced by half (i.e., a factor of two), and is still discernable, a substantial improvement in the measurement quality is nonetheless recognized. Thus, to "substantially reduce" the measurement error as used herein is considered to be reducing the measurement error by a factor of at least 2. Applicant has found that use of the tilt features, neutral density filter, and/or polarizer, alone or in combination, may result in complete elimination of the unwanted errors caused by secondary reflections.

Applicant appreciates that use of anti-reflective coatings or layers, while reducing an intensity of secondary reflections, or providing a scattering or diffusing characteristic, are not adequate to provide meaningful reduction to the measurement errors, and do not amount to "substantially reduce" measurement error caused by secondary reflection. Accordingly, means for reducing 80, or means for preventing 70, 72 as used herein specifically exclude traditional anti-reflective layers or coatings. Of course, anti-reflective layers or coatings are used, and/or may be used, in conjunction with the invention. Reticles 30 and/or sensors 60 may include anti-reflective layers or coatings, but such layers or coatings are not means for reducing 80 or means for preventing 70, 72, and do not, by themselves, "substantially reduce" measurement error caused by secondary reflection of the reference light from surfaces at or near the focal plane. The presence of an anti-reflection layer or coating at surfaces at or near the focal plane of an autocollimator, by itself, does not amount to a device configured to "substantially reduce" (and/or prevent) measurement error caused by secondary reflection of the reference light from surfaces at or near the focal plane as defined herein or as referenced in the claims.

In other aspects, and as further defined below, autocollimator 20 includes means for reducing 80 an amount or intensity of secondary reflections impacting the sensor 60 where the means for reducing 80 includes a circular polarizer 74 positioned as noted herein such that a sufficiently reduced amount or intensity of secondary reflections 35 reach the sensor 60 such that those secondary reflections 35 are inconsequential (i.e., are very low when compared to the intensity of the desired image 26 upon sensor 60 such that errors are minimal).

In further aspects, means for reducing 80 includes an external circular polarizer, a circular polarizer in front of a reticle and/or in front of a sensor, a polarizing beamsplitter together with separate quarter wave plate adjacent the objective lens, a neutral density filter, a baffle (whether the baffle is positioned in front of the lens or in front of the sensor and/or in front of the reticle), a reduced aperture positioned in front of the lens, a curved surface positioned between the reticle and beam splitter, a curved surface positioned between the sensor and beam splitter, a planar surface at or near the focal plane oriented such that secondary reflections from the planar surface are directed other than along an optical axis of the light source. In aspects, such means for substantially reducing also includes means for preventing secondary reflection of the reference light from at or near the focal plane from reaching the sensor and also include means for preventing measurement error caused by the secondary reflection.

Further aspects of the invention include a method of retrofitting a prior art autocollimator, the method including the step of positioning a circular polarizer 74 such that secondary reflections 35, 27 of a reference light 26 from a surface at or near the focal plane of the objective lens 50 are prevented from reaching the sensor 60. Further aspects of the invention include a method of retrofitting a prior art autocollimator, the method including the step of tilting the reticle such that secondary reflections 35 of a reference light 26 from a surface of the reticle near the focal plane of the objective lens 50 are directed away from the optical axis or otherwise prevented from reaching the sensor 60. Further aspects of retrofitting include tilting the sensor or a cover glass of the sensor such that secondary reflections 35 or a reference light 26 from a surface of the sensor or cover plate near the focal plane are directed away from the optical axis or otherwise prevented from reaching back to the sensor 60. Further aspect of retrofitting include use of a beamsplitter with a surface near the focal plane tilted such that the secondary reflections are directed away from the optical axis or otherwise prevented from reaching back to the sensor 60. Further aspects of the invention include a method of retrofitting a prior art autocollimator, the method including the step of positioning a neutral density filter such that secondary reflections of a reference light from a surface at or near the focal plane of the objective lens are reduced in intensity relative to the desired reflection from the test surface. Retrofitting by use of a neutral density filter is effective in many cases and is both less expensive and avoids introducing polarization considerations compared to other methods. Further aspects of retrofitting include use of the other means and aspects presented herein to modify existing autocollimators.

In further aspects of the invention, including with respect to retrofitting an existing autocollimator, a polarizer or filter is placed outside the autocollimator in front of the objective lens and is slightly tilted so reflections from the polarizer or filter do not interfere with the measurement of the movement of the test surface. This placement will reduce, in the case of a neutral density filter 86, or eliminate, in the case of a circular polarizer 74, secondary reflections from both he reticle and sensor. In this arrangement the desired signal passes through the filter twice, therefor resulting in a substantial loss of intensity compared to other techniques or arrangements noted herein. Even so, in some or many cases, such reduction of intensity may be acceptable in light of the low cost while achieving sufficient results.

In further aspects of the invention, including with respect to retrofitting an existing autocollimator, in a case where troublesome secondary reflection comes from only one of, or primarily one of, the reticle 30 or sensor 60, the polarizer or filter can be placed between the beam splitter 40 and the source of the problem secondary reflection. Such placement has an advantage that the desired signal 26 only passes through the polarizer or filter one time, so the loss of intensity for the desired signal 26 is much less, while the signal to "noise" improvement is the same as though the filter or polarizer was in from of the objective lens 50.

In further aspects of the invention, including with respect to retrofitting an existing autocollimator, the polarizer or the filter is placed between the beam splitter 40 and the objective lens 50. The effect of the polarizer or filter in this position is similar to placing the polarizer or filter in front of the objective lens yet introduces slightly more spherical aberration to the system.

In further aspects the invention includes a method of retrofitting an autocollimator 20 having a light source projector 22 which projects a reference light or image 26 through a beam splitter 40 and through an objective lens 50 to a test object 28, the objective lens 50 defining a focal plane 55, a measuring telescope 24 comprising a light sensor 60 which receives, through the objective lens 50 and through the beam splitter 40, the reference light 26 reflected from the test object 28 to determine movement of the test object, the method including providing means for preventing 70 secondary reflection 35 of the reference light 26 at or near the focal plane 55 from reaching the sensor 60. In further or alternative aspects, the method of retrofitting includes providing means for reducing 80 secondary reflection 35 of the reference light 26 at or near the focal plane 55 to a level below a practical level of importance.

In further aspects the invention includes combinations of the foregoing, including but not limited to use of polarizers in conjunction with the tilt of planar surfaces at or near the focal plane, the use of means for preventing together with means for reducing, the use of polarizers together with means for preventing and/or means for reducing, or other combinations.

It should be understood, of course, that the foregoing relates to exemplary embodiments of the invention and that modifications may be made without departing from the spirit and scope of the invention as set forth in the following claims.

I claim:

1. An autocollimator for projecting a reference light onto a reflective test object to determine movement of the test object, the autocollimator comprising:

- a light source projector which projects the reference light through a beamsplitter and through an objective lens and to the test object, the objective lens defining a focal plane;
- a measuring telescope comprising a light sensor which receives, through the objective lens and through the beamsplitter, the reference light reflected from the test object to determine movement of the test object; and
- means for preventing secondary reflection of the reference light at or near the focal plane from reaching the sensor.

2. The autocollimator of claim 1 where the reference light derives from a reference source which projects the reference light along an optical axis of the light source projector, the reference light passing through a reticle having a planar surface proximal the beamsplitter, reference light returning from the test object and reflected by the planar surface being the secondary reflection of the reference light, where the means for preventing secondary reflection of the reference light from reaching the sensor includes the planar surface oriented such that the secondary reflection is reflected away from the optical axis, thereby preventing secondary reflection of the reference light from traveling back to the test object and back to the sensor.

3. The autocollimator of claim 1 where the reference light derives from a reference source which projects the reference light along an optical axis of the measuring telescope, the sensor having a planar surface proximal the beamsplitter, the reference light from the test object traveling to and reflected by the planar surface of the sensor being the secondary reflection of the reference light, where the means for preventing secondary reflection of the reference light from reaching the sensor includes the planar surface oriented such that the secondary reflection is reflected away from the optical axis, thereby preventing secondary reflection of the reference light from traveling back to the test object and back to the sensor.

4. The autocollimator of claim 1 where the means for preventing secondary reflection of the reference light from reaching the sensor includes a circular polarizer, the lens positioned between the circular polarizer and the light sensor.

5. The autocollimator of claim 4 where the circular polarizer includes a quarter wave plate positioned proximal the lens and a linear polarizer positioned distal the lens.

6. The autocollimator of claim 1 where the means for preventing secondary reflection of the reference light from reaching the sensor includes a circular polarizer, the circular polarizer positioned at a location which includes one from the group of positioning the circular polarizer between the beam splitter and the reticle, positioning the circular polarizer between the beam splitter and the sensor, and positioned the circular polarizer between the objective lens and the beam splitter.

7. An autocollimator for projecting a reference light onto a reflective test object to determine movement of the test object, the autocollimator comprising:

a light source projector which projects the reference light through a beamsplitter and through an objective lens and to the test object, the objective lens defining a focal plane; and a measuring telescope comprising a light sensor which receives, through the objective lens and through the beamsplitter, the reference light reflected from the test object to determine movement of the test object, the light source projector and/or the measuring telescope configured to substantially reduce measurement error otherwise caused by secondary reflection of the reference light from surfaces at or near the focal plane and where the reference light derives from a reference source which projects the reference light along an optical axis of the light source projector, the reference light passing through a reticle having a planar surface proximal the beamsplitter, reference light returning from the test object and reflected by the planar surface being the secondary reflection of the reference light, the planar surface oriented such that the secondary reflection is reflected away from the optical axis, thereby reducing or preventing secondary reflection of the reference light from traveling back to the test object and back to the sensor.

8. An autocollimator for projecting a reference light onto a reflective test object to determine movement of the test object, the autocollimator comprising:

a light source projector which projects the reference light through a beamsplitter and through an objective lens and to the test object, the objective lens defining a focal plane; and a measuring telescope comprising a light sensor which receives, through the objective lens and through the beamsplitter, the reference light reflected from the test object to determine movement of the test object, the light source projector and/or the measuring telescope configured to substantially reduce measurement error otherwise caused by secondary reflection of the reference light from surfaces at or near the focal plane and where the reference light derives from a reference source which projects the reference light along an optical axis of the measuring telescope, the sensor having a planar surface proximal the beamsplitter, the reference light from the test object traveling to and reflected by the planar surface of the sensor being the secondary reflection of the reference light, the planar surface oriented such that the secondary reflection is reflected away from the optical axis, thereby reducing or preventing secondary reflection of the reference light from traveling back to the test object and back to the sensor.

9. An autocollimator for projecting a reference light onto a reflective test object to determine movement of the test object, the autocollimator comprising:

a light source projector which projects the reference light through a beamsplitter and through an objective lens and to the test object, the objective lens defining a focal plane; and a measuring telescope comprising a light sensor which receives, through the objective lens and through the beamsplitter, the reference light reflected from the test object to determine movement of the test object, the light source projector and/or the measuring telescope configured to substantially reduce measurement error otherwise caused by secondary reflection of the reference light from surfaces at or near the focal plane and where the light source projector and/or the measuring telescope includes a neutral density filter, the neutral density filter positioned at a location which includes one from the group of positioning the neutral density filter between the beam splitter and the reticle, positioning the neutral density filter between the beam splitter and the sensor, positioned the neutral density filter between the objective lens and the beam splitter and positioning the neutral density filter such that the lens is positioned between the neutral density filter and the light sensor.

10. An autocollimator for projecting a reference light onto a reflective test object to determine movement of the test object, the autocollimator comprising:

a measuring telescope comprising a light sensor which receives, through an objective lens and thorough a beamsplitter, the reference light reflected from the test object to determine movement of the test object; and a light source projector which projects the reference light along an optical axis of the light source projector and through a reticle having a planar surface proximal the beamsplitter and through the objective lens and to the test object, reference light returning from the test object and reflected by the planar surface being secondary reflection of the reference light, the planar surface configured such that the secondary reflection is reflected away from the optical axis.

11. The autocollimator of claim 10, the sensor having a planar surface proximal the beamsplitter, the reference light from the test object traveling to and reflected by the planar surface of the sensor being secondary reflection of the reference light, the planar surface of the sensor oriented such that the secondary reflection is reflected away from the optical axis.

12. An autocollimator for projecting a reference light onto a reflective test object to determine movement of the test object, the autocollimator comprising:

a light source projector which projects the reference light through a beamsplitter and through an objective lens and to the test object; and a measuring telescope defining an optical axis and comprising a light sensor which receives, through the objective lens and through the beamsplitter, the reference light reflected from the test object to determine movement of the test object, the sensor having a planar surface proximal the beamsplitter, the reference light from the test object traveling to and reflected by the planar surface of the sensor being secondary reflection of the reference light, the planar surface oriented such that the secondary reflection is reflected away from the optical axis, thereby preventing secondary reflection of the reference light from traveling back to the test object and back to the sensor.

13. The autocollimator of claim 12, the reticle having a planar surface proximal the beamsplitter, the reference light from the test object traveling to and reflected by the planar surface of the reticle being secondary reflection of the reference light, the planar surface of the reticle oriented such that the secondary reflection is reflected away from the optical axis.

14. The autocollimator of claim 12 where the sensor includes a cover glass proximal the beamsplitter, the cover glass comprises the planar surface.

15. An autocollimator for projecting a reference light onto a reflective test object to determine movement of the test object, the autocollimator comprising:

a light source projector which projects the reference light through a beamsplitter and through an objective lens and to the test object; and a measuring telescope comprising a light sensor which receives, through the objective lens and thorough the beamsplitter, the reference light reflected from the test object to determine movement of the test object; and a circular polarizer positioned to reduce secondary reflections from surfaces at or near a focal plane of the lens.

16. The autocollimator of claim 15 where the lens is positioned between the circular polarizer and the light sensor.

17. The autocollimator of claim 15 where the circular polarizer is positioned at a location which includes one from the group of positioning the circular polarizer between the beam splitter and the reticle, positioning the circular polarizer between the beam splitter and the sensor, and positioned the circular polarizer between the objective lens and the beam splitter.

18. An autocollimator for projecting a reference light onto a reflective test object to determine movement of the test object, the autocollimator comprising:

a light source projector which projects the reference light through a beamsplitter and through an objective lens and to the test object; and a measuring telescope comprising a light sensor which receives, through the objective lens and thorough the beamsplitter, the reference light reflected from the test object to determine movement of the test object; and a neutral density filter positioned to reduce secondary reflections from surfaces at or near a focal plane of the lens.

19. The autocollimator of claim 18 where the lens is positioned between the neutral density filter and the beam splitter.

20. The autocollimator of claim 18 where the neutral density filter is positioned at a location which includes one from the group of positioning the neutral density filter between the beam splitter and the reticle, positioning the neutral density filter between the beam splitter and the sensor, and positioned the neutral density filter between the objective lens and the beam splitter.

21. An autocollimator for projecting a reference light onto a reflective test object to determine movement of the test object, the autocollimator comprising:

a light source projector which projects the reference light through a beamsplitter and through an objective lens and to the test object, the objective lens defining a focal plane;

a measuring telescope comprising a light sensor which receives, through the objective lens and through the beamsplitter, the reference light reflected from the test object to determine movement of the test object; and means for substantially reducing measurement error caused by secondary reflection of the reference light from at or near the focal plane.

22. The autocollimator of claim 21 where the means for substantially reducing includes means for preventing secondary reflection of the reference light from reaching the sensor.

23. The autocollimator of claim 21 where the means for substantially reducing includes one from the group of a neutral density filter, a circular polarizer, a reduced aperture positioned in front of the lens, a baffle, neutral density filter, circular polarizer and/or a curved surface positioned between the reticle and beam splitter, a baffle, neutral density filter, circular polarizer and/or a curved surface positioned between the sensor and beam splitter, a planar surface at or near the focal plane oriented such that secondary reflections from the planar surface are directed other than along an optical axis of the light source projector.

* * * * *